(12) United States Patent
Resch

(10) Patent No.: US 10,104,045 B2
(45) Date of Patent: Oct. 16, 2018

(54) VERIFYING DATA SECURITY IN A DISPERSED STORAGE NETWORK

(75) Inventor: Jason K. Resch, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 12/762,350

(22) Filed: Apr. 18, 2010

(65) Prior Publication Data

US 2010/0268692 A1    Oct. 21, 2010

Related U.S. Application Data

(63) Continuation-in-part of application No. 12/426,727, filed on Apr. 20, 2009, now Pat. No. 9,483,656.

(60) Provisional application No. 61/237,634, filed on Aug. 27, 2009.

(51) Int. Cl.
| | | |
|---|---|---|
| G06F 7/00 | (2006.01) |
| H04L 29/06 | (2006.01) |
| G06F 17/30 | (2006.01) |
| G06F 11/10 | (2006.01) |
| G06F 21/64 | (2013.01) |
| H04L 9/08 | (2006.01) |
| H04L 9/32 | (2006.01) |
| H04L 29/08 | (2006.01) |

(52) U.S. Cl.
CPC ...... *H04L 63/0428* (2013.01); *G06F 11/1044* (2013.01); *G06F 17/30156* (2013.01); *G06F 17/30371* (2013.01); *G06F 21/64* (2013.01); *H04L 9/085* (2013.01); *H04L 9/3236* (2013.01); *H04L 67/1097* (2013.01); *G06F 2211/1028* (2013.01); *G06F 2211/1059* (2013.01); *H04L 63/12* (2013.01); *H04L 2209/043* (2013.01); *H04L 2209/12* (2013.01); *H04L 2209/603* (2013.01); *H04L 2209/608* (2013.01); *H04L 2209/80* (2013.01)

(58) Field of Classification Search
CPC .................................................. G06F 17/30371
USPC ............................................................ 707/687
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Ajith Jacob
(74) *Attorney, Agent, or Firm* — Garlick & Markison; Timothy W. Markison

(57) ABSTRACT

An integrity record is appended to data slices prior to being sent to multiple slice storage units. Each of the data slices includes a different encoded version of the same data segment. An integrity indicator of each data slice is computed, and the integrity record is generated based on each of the individual integrity indicators, and may be, for example, list or a hash of the combined integrity indicators. When retrieving data slices from storage, the integrity record can be stripped off, a new integrity indicator of the data slice calculated, and a new integrity record created. The new integrity record can be compared to the original integrity record, and used to verify the integrity of the data slices.

8 Claims, 14 Drawing Sheets

(56) References Cited

U.S. PATENT DOCUMENTS

| | | | |
|---|---|---|---|
| 5,619,571 A * | 4/1997 | Sandstrom et al. | 380/200 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 5/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125569 A1 * | 6/2005 | Swidler et al. | 710/8 |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2005/0246093 A1 * | 11/2005 | Olague et al. | 701/207 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0283167 A1 | 6/2007 | Venters, III et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2009/0006853 A1 * | 1/2009 | Li | 713/176 |
| 2009/0094250 A1 * | 4/2009 | Dhuse et al. | 707/10 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

VERIFYING DATA SECURITY IN A DISPERSED STORAGE NETWORK

CROSS REFERENCE TO RELATED PATENTS

This application claims the benefit of U.S. Provisional Application No. 61/237,634, filed Aug. 27, 2009, and entitled "SECURING DATA IN A DISPERSED STORAGE NETWORK"; and is a continuation in part of co-pending U.S. application Ser. No. 12/426,727, filed Apr. 20, 2009, and entitled "EFFICIENT AND SECURE DATA STORAGE UTILIZING A DISPERSED DATA STORAGE SYSTEM", both of which are incorporated herein in their entirety by reference for all purposes.

The present application is related to the following co-pending applications:

1. Utility application Ser. No. 12/760,066 filed Apr. 14, 2010, and entitled "SECURING DATA IN A DISPERSED STORAGE NETWORK USING SECURITY SENTINAL VALUE" (CS252); and
2. Utility application Ser. No. 12/762,352 filed Apr. 18, 2010, and entitled "SECURING DATA IN A DISPERSED STORAGE NETWORK USING SHARED SECRET SLICES" (CS108), both of which are incorporated herein for all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to computing and more particularly to storage of information.

2. Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With the advances in computing processing speed and communication speed, computers manipulate real time media from voice to streaming high definition video. Purpose-built communications devices, like the phone, are being replaced by more general-purpose information appliances. For example, smart phones can support telephony communications but they are also capable of text messaging, and accessing the internet to perform functions including email, web browsing, remote applications access, and media communications. Media communications includes telephony voice, image transfer, music files, video files, real time video streaming and more.

Each type of computing system is constructed, and hence operates, in accordance with one or more communication, processing, and storage standards. With such standards, and with advances in technology, more and more of the global information content is being converted into electronic formats. For example, more digital cameras are now being sold than film cameras, thus producing more digital pictures. High growth rates exist for web based programming that until recently was all broadcast by just a few over the air television stations and cable television providers. Digital content standards, such as used in pictures, papers, books, video entertainment, home video, all enable this global transformation to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory can be accessed in any random order with a constant response time. By contrast, memory device technologies that require physical movement such as magnetic discs, tapes, and optical discs, have a variable responses time as the physical movement can take longer than the data transfer.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically a memory controller provides an interface function between the processing function and memory devices. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Drawbacks of the RAID approach include effectiveness, efficiency and security. As more discs are added, the probability of one or two discs failing rises and is not negligible, especially if more desired less costly discs are used. When one disc fails, it should be immediately replaced and the data reconstructed before a second drive fails. To provide high reliability over a long time period, and if the RAID array is part of a national level computing system with occasional site outages, it is also common to mirror RAID arrays at different physical locations. Unauthorized file access becomes a more acute problem when whole copies of the same file are replicated, either on just one storage system site or at two or more sites. In light of the effectiveness, the efficiency of dedicating 1 to 2 discs per array for the RAID overhead is an issue.

Therefore, a need exists to provide a data storage solution that provides more effective timeless continuity of data, minimizes adverse affects of multiple memory elements failures, provides improved security, can be adapted to a wide variety storage system standards and is compatible with computing and communications systems.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
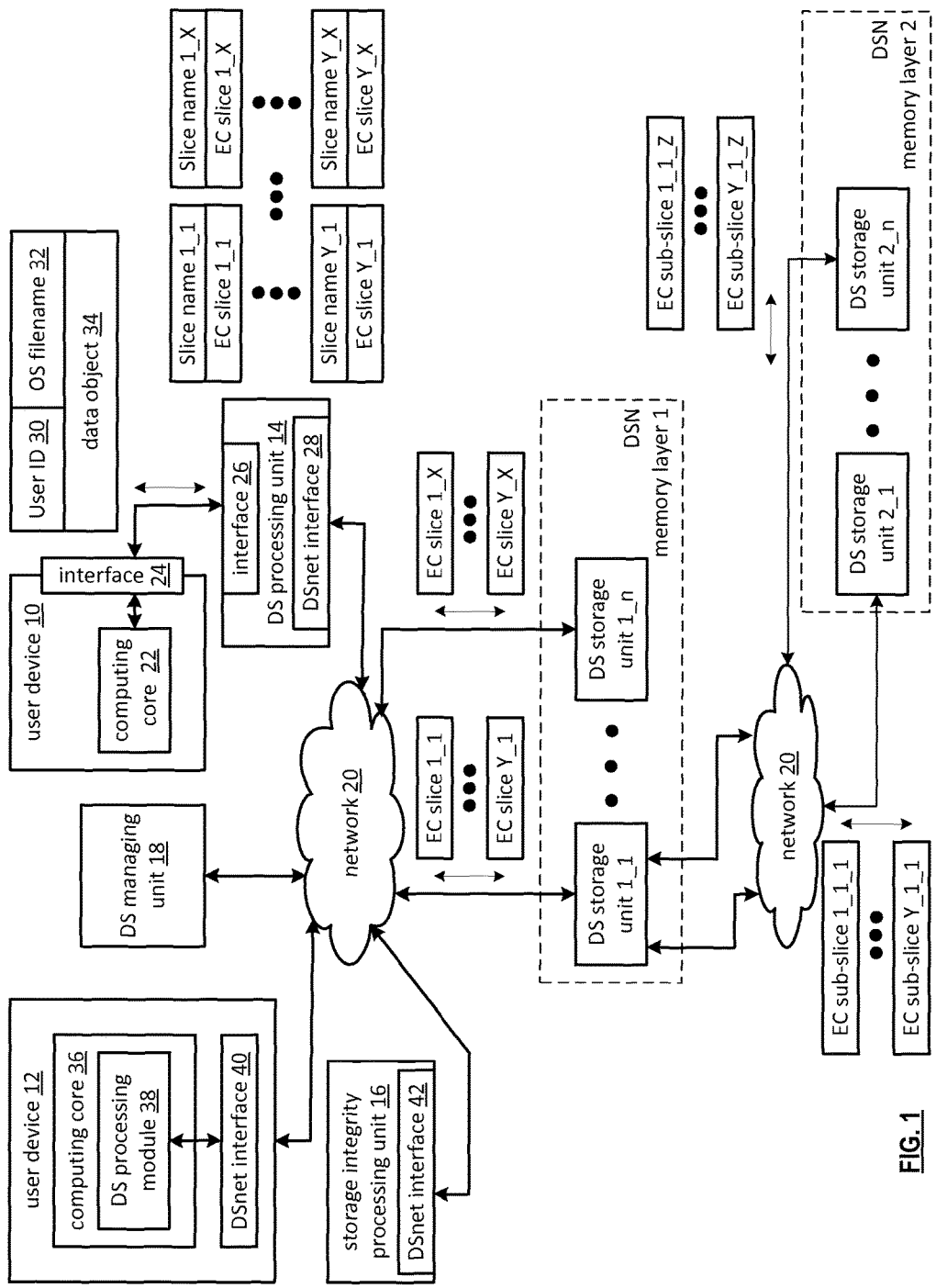
FIG. 1 is a schematic block diagram of an embodiment of a computing system in accordance with the invention.

FIG. 1 is a schematic block diagram of an embodiment of a computing system that includes a first user device 10, a dispersed storage (DS) processing unit 14, a plurality of dispersed storage network (DSN) memory layers 1 & 2 (but could include more than two), a storage integrity processing unit 16, a second user device 12, a DS managing unit 18, and a network 20. Each of the DSN memory layers include a plurality of dispersed storage (DS) storage units 1-n, where n is equal to or greater than 3 and may vary from layer to layer. Note that a DS storage unit may be in one or more DSN memory layers. The DSN memory layers may be a subset of the total set of DS storage units.

Each of the user devices 10 and 12 (note that the system may include more than 2 user devices) may be a portable device and/or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, a video game console, and/or any type of home or office computing equipment.

The user device 10 includes a computing core 22 (which will be described in greater detail with reference to FIG. 3) and an interface 24. The interface 24, which includes hardware and/or firmware, communicates with the DS processing unit 14 using one or more storage system standards such that the user device 10 utilizes a storage standard native to its operating system. The user device 12 includes a computer core 36 (which may be of the same construct as the computing core 22 of user device 10) and a DS network interface 40. The computing core 36 includes a DS processing module 38.

Each of the DS processing unit 14, the DS storage units, the storage integrity processing unit 16, and/or the DS managing unit 18 may be a portable device, may be a fixed device, and/or may be a functional module within another unit and/or device. For example, the DS managing unit 18 may be a computer server and the storage integrity processing unit 16 may be a functional module operating on the computer server. In another example, the DS processing unit 14 may be a DS processing module operating on the same computing device as one of the DS storage units. Further, each of the DS processing unit 14, the DS storage units, the storage integrity processing unit 16, the DS managing unit 18 includes a DS network interface 28, 40, 42 (whether shown or not). The DS network interface provides connectivity to the network 20 and includes the hardware and/or firmware to support the protocol of the network (e.g., LAN, WLAN, WAN, public switching network, the internet, etc.).

The network 20 may be a wire lined and/or wireless communication system or a system of systems that provide communications capability between the devices and units. The system of systems may be a combination of private intranets and the public internet. For example, the DS processing unit 14 has access to the network 20 by way of an optical sub-network and the second user device 12 has access to the network 20 by way of a 4G Long Term Evolution (LTE) wireless network. As another example, the DS storage units may communicate with each other via the network 20 and/or via direct connections therebetween, whether they are in the same DSN memory layers or a different DSN memory layer.

In an example of operation of the computing system, the computing core 22 of the user device 10 initiates the sequence to store data by transmitting a data object 34 to the DS processing unit 14 via the interfaces 24 and 26. The data object 34 may include a data file, data blocks, a real time data stream and/or any other format of digital information. The data object may further include a user identification code (ID) 30 and an operating system (OS) filename 32 to mimic a conventional file system interface and/or block system interface (e.g., network file system (NFS), flash file system (FFS), disk file system (DFS), small computer system interface (SCSI), internet small computer system interface (iSCSI), file transfer protocol (FTP), and web-based distributed authoring and versioning (WebDAV)).

The DS processing unit 14 receives the data, or data object 34, and breaks it down into Y data segments. For example, if the data object is 1 Giga-Byte (GB), the DS processing unit 14 may segment the data object into 1000 1 Mega-Byte (MB) data segments. The DS processing unit 14 then error encodes (e.g., using an error encoding function such as a forward error correction function, an information dispersal algorithm, etc.) each data segment to produce X error coded (EC) slices per data segment. The value X represents the width of the error encoding function. For example, X may range from 4 to 256 or more. The number of slices X per segment may also be referred to pillars.

The DS processing unit 14 creates a unique slice name (e.g., 1_1; 1_X; Y_1; Y_X) for each error coded (EC) data slice and attaches the slice name to each EC data slice (e.g., 1_1; 1_X; Y_1; Y_X). The slice name includes universal DSN memory layer addressing routing information and user-specific information based on the OS filename 32 to tie the two together. The creation and utilization of the slice name will be described in greater detail with reference to one or more of FIGS. 2-17.

The DS processing unit 14 may also determine to further error encode one or more of the slices of a segment (i.e., sub-slicing). Such a determination may be based on a number of factors. For example, the DS processing unit 14 may determine that further security may be obtained by sub-slicing a select number (e.g., a security threshold) of the slices per segment, which may be from the same pillars for each segment or from different pillars from segment to segment. As a specific example, if the width (i.e., X) is 16 and the read threshold (e.g., minimum number of slices required to reconstruct the data segment) is 10, then 7 or more slices per segment may be sub-sliced such that a read threshold cannot be achieved without reconstructing a slice from the sub-slices.

The DS processing unit 14 may also determine to sub-slice at least one slice of a data segment for a number of other reasons. For example, one or more of retrieval latency for each of the DS storage units; priority of the selected encoded slice; a data type of the data segment; availability of each of DS storage units; and/or cost of storing an encoded slice in each of the DS storage units may affect the determination to sub-slice.

The DS processing unit 14 may perform the sub-slicing of one or more slices itself or may instruct one or more of the DS storage units to perform the sub-slicing. When the DS processing unit 14 performs the sub-slicing, it adds memory layer 2 slice names to the sub-slices (e.g., 1_1_1; Y_1_1; 1_1_Z; Y_1_Z), where Z corresponds to the width of the sub-slicing. When the DS processing unit 14 wants a DS storage unit to perform the sub-slicing, it generates a corresponding command. As another example, the DS processing unit 14 does not initiate the sub-slicing; one or more of the DS storage units makes the determination for the slices it is to store.

Having generated the EC slices and rendered a decision regarding sub-slicing (or no decision), the DS processing unit 14 sends the EC slices 1 through X of a data segment to the DS storage units 1_1 through 1_n of the first DSN memory layer. The DS processing unit 14 may also send a command regarding sub-slicing with one or more of the EC slices to the corresponding DS storage unit. For example, if the DS processing unit 14 has determined that the first slice (e.g., 1_1; Y_1) of each segment is to be sub-sliced, it sends the command to DS storage unit 1_1 with at least the first slice (e.g., 1_1). Note that the command may be for an individual data segment, the data object, or a portion thereof.

Upon receiving an EC slice, a DS storage unit determines whether it will sub-slice the EC slice. Such a determination may be based on receiving a command from the DS processing unit 14 or an individual determination based on at least some of the same factors that the DS processing unit 14 may use to render a sub-slicing decision. If the DS storage unit is not to sub-slice the EC slice, it translates the virtual DSN memory layer address of the slice name into a local physical address and stores the EC slice at the physical address.

If a DS storage unit determines that it is to sub-slice an EC slice, it creates EC data sub-slices the EC data slice using a sub-slicing algorithm (e.g., a forward error correction algorithm, an information dispersal algorithm, etc.). In addition, the DS storage unit creates a unique sub-slice name (e.g., 1_1_1; 1_1_Z; Y_1_1; Y_1_Z, where Z corresponds to the width of the sub-slicing algorithm) for each sub-slice and attaches it to the corresponding sub-slice. The sub-slice names may also include universal DSN memory layer addressing routing information and user-specific information to tie the two together.

The DS storage unit may also determine to further sub-slice at least one sub-slice of an EC slice for similar reasons used by the DS processing unit to determine whether to sub-slice an EC slice. The DS storage unit may perform the further sub-slicing of a sub-slice itself or may instruct one or more of the DS storage units of the next memory layer to perform the further sub-slicing. When the DS storage unit performs the further sub-slicing, it adds memory layer 3 further sub-slice names to the sub-slices (e.g., 1_1_1_1; Y_1_1_1; 1_1_1_A; Y_1_1_A), where A corresponds to the width of the further sub-slicing. When the DS storage unit wants a DS storage unit to perform the further sub-slicing, it generates a corresponding command.

Having generated the sub-slices and rendered a decision regarding further sub-slicing, the DS storage unit sends the sub-slices 1_1 through 1_Z of an EC slice to the DS storage units 2_1 through 2_n of the seconds DSN memory layer. The DS storage unit may also send a command regarding further sub-slicing of one or more of the sub-slices to the corresponding DS storage unit.

Storage of data for the user device 12 operates in a similar manner as described above, with the exception that the user 12 includes the DS processing unit functionality within its computer core 36. More specifically, the user device 12 includes a DS processing module 38, which performs similar functions as performed by the DS processing unit 14.

In another example of operation, the DS managing unit 18 functions to receive and aggregate network management alarms, alerts, errors, status information, performance information, and/or messages from the modules and/or units of the computing system. The DS managing unit 18 functions may also include functions to configure the computing system and perform a billing function for the computing system. For example, the DS managing unit 18 may determine the number of DS storage units to configure to meet the operation requirements of a particular user. The configuration may include assignment of DSN memory layer addresses. In another example, the DS managing unit may track the usage of the DSN memory layers by the user to create a summary and/or bill. The DS managing unit 18 may also automatically determine optimization of the configuration of the computing system based in part from determining the correlation of past and present configurations with performance. The DS managing unit 18 may share the correlation and configurations with other computing systems managing a different DSN memory layers to further optimize the computing system.

In another example of operations, the storage integrity processing unit 16 scans the contents of the DSN memory layers to detect undesired conditions including data corruption, missing data, out of date data, and/or offline DS storage units. When the storage integrity processing unit 16 detects an undesired condition, it rebuilds a portion of the data in the DSN memory layers and alerts the DS managing unit 18 when undesired conditions are detected. The storage integrity processing unit 16 rebuilds the data by retrieving available data, processing the available data to produce rebuilt data, and storing the rebuilt data in the DSN memory layers. The process to produce rebuilt data will be described in greater detail with reference to FIGS. 4-6.

Figure 2:
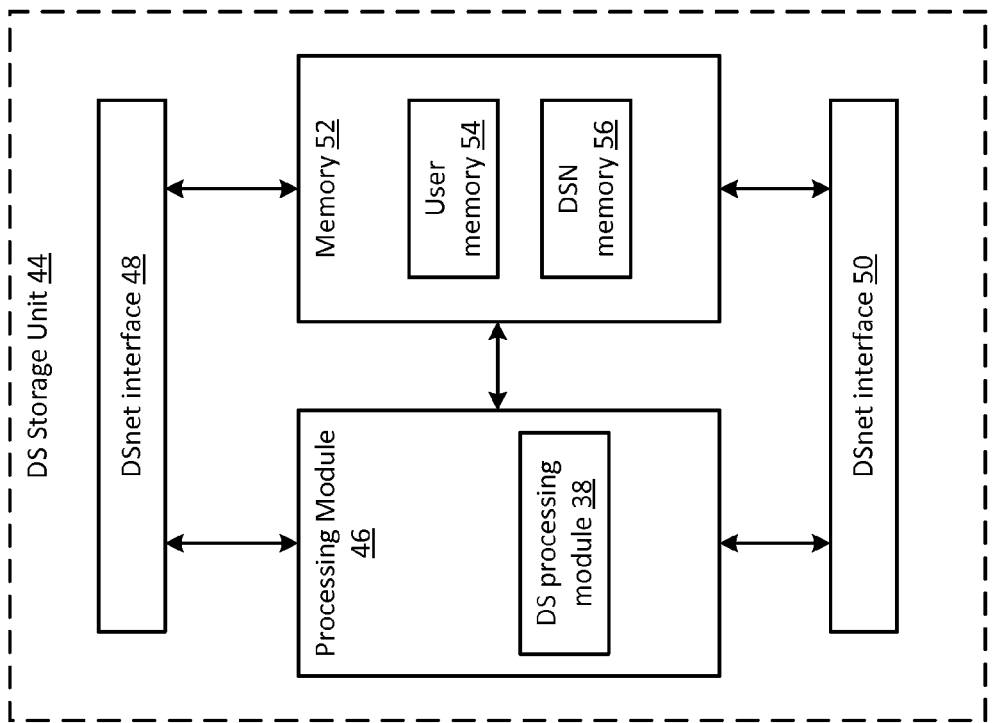
FIG. 2 is a schematic block diagram of an embodiment of a dispersed storage (DS) storage unit in accordance with the invention.

FIG. 2 is a schematic block diagram of an embodiment of a dispersed storage (DS) storage unit 44 (e.g., any of the DS storage units of FIG. 1) that includes a processing module 46, at least one DSnet interface 48-50, and a memory 52. The processing module 46 includes a DS processing module 38 and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17.

In an example of operation, the processing module 46 receives, via the DSnet interface 48, an EC data slice (or sub-slice) for storage and may further receive a command regarding further sub-slicing of the EC data slice. When the command is received, the processing module 46 interprets it to determine whether the EC slice is to be sub-sliced. Note that the command may include instructions not to sub-slice the EC slice, may include instructions that the EC slice is to be sub-sliced and the sub-slicing function to use, or it may include an instruction to sub-slice leaving the details to the DS storage unit 44.

When a command is received and it includes instructions to sub-slice, the DS processing module 38 performs the sub-slicing as described with reference to FIG. 1. When a command is not received, the processing module 46 determines whether to sub-slice the received EC slice (or sub-slice). Such a determination may be made based on demands of user memory 54 and/or of DSN memory 56. For instance, if the DSN memory 56 has limited availability, then sub-slicing and storing the EC slice elsewhere may be preferred. In this instance, the processing module 46 determines how to re-disperse the EC slice (or sub-slice). The determination may be based on guidance from one or more of a user vault (e.g., stored parameters for this user), a command from the DS managing unit or other system element, priority of the EC data slice, type of data in the EC data slice, and/or retrieval speed requirements. The re-dispersion guidance may include the parameters for encoding, slicing and which DS storage units 44 to utilize.

Having rendered a decision on how to sub-slice, the processing module 46 creates EC sub-slices and sends the EC data sub-slices to other DS storage units via the DSnet interface 50. In addition, the processing module 46 updates a virtual DSN address to physical location table with the locations of the EC data sub-slices. The processing module 46 may store the virtual DSN address to physical location table in the user memory 54 and/or may send the table to another DSN element (e.g., a higher memory level DS storage unit, the DS processing unit 14, the DS managing unit 18, the storage integrity processing unit 16, and/or the user device 10 12). The virtual DSN address to physical location table will be discussed in greater detail with reference to FIGS. 8 and 11.

Figure 3:
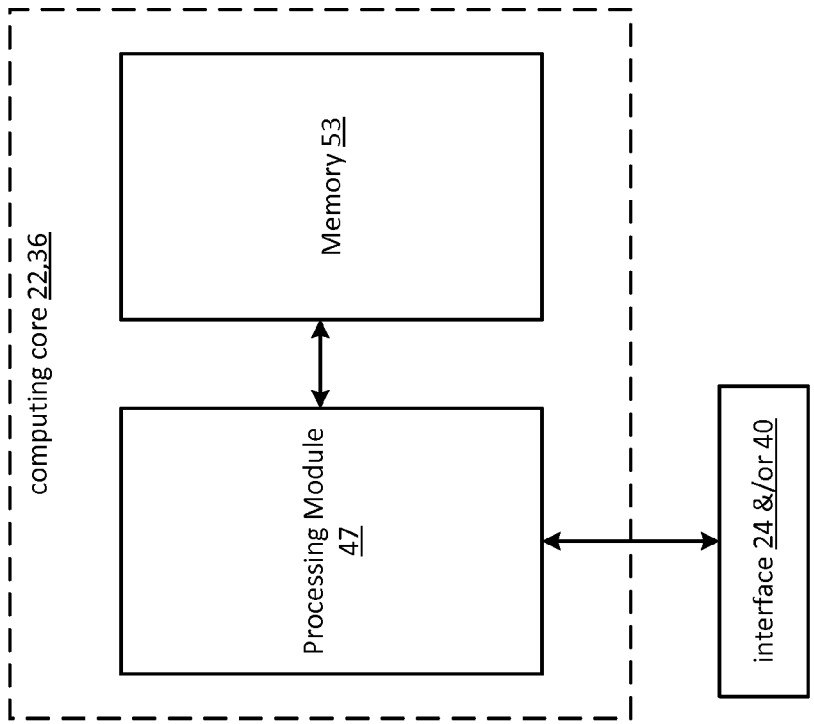
FIG. 3 is a schematic block diagram of an embodiment of a computing core in accordance with the invention.

FIG. 3 is a schematic block diagram of an embodiment of a computing core 22 and/or 36 that includes a processing module 47 and memory 53. The computing core 22 and/or 36 may be of a conventional central processing unit architecture and/or a proprietary architecture. In such a computing core 22 and/or 36, the memory 53 includes cache (levels 1 and/or 2), main memory (e.g., RAM), secondary memory (e.g., internal hard drive, solid-state memory, etc.), and/or backup memory (external hard drive, magnetic tape, etc.). The processing module 47 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17.

Figure 4:
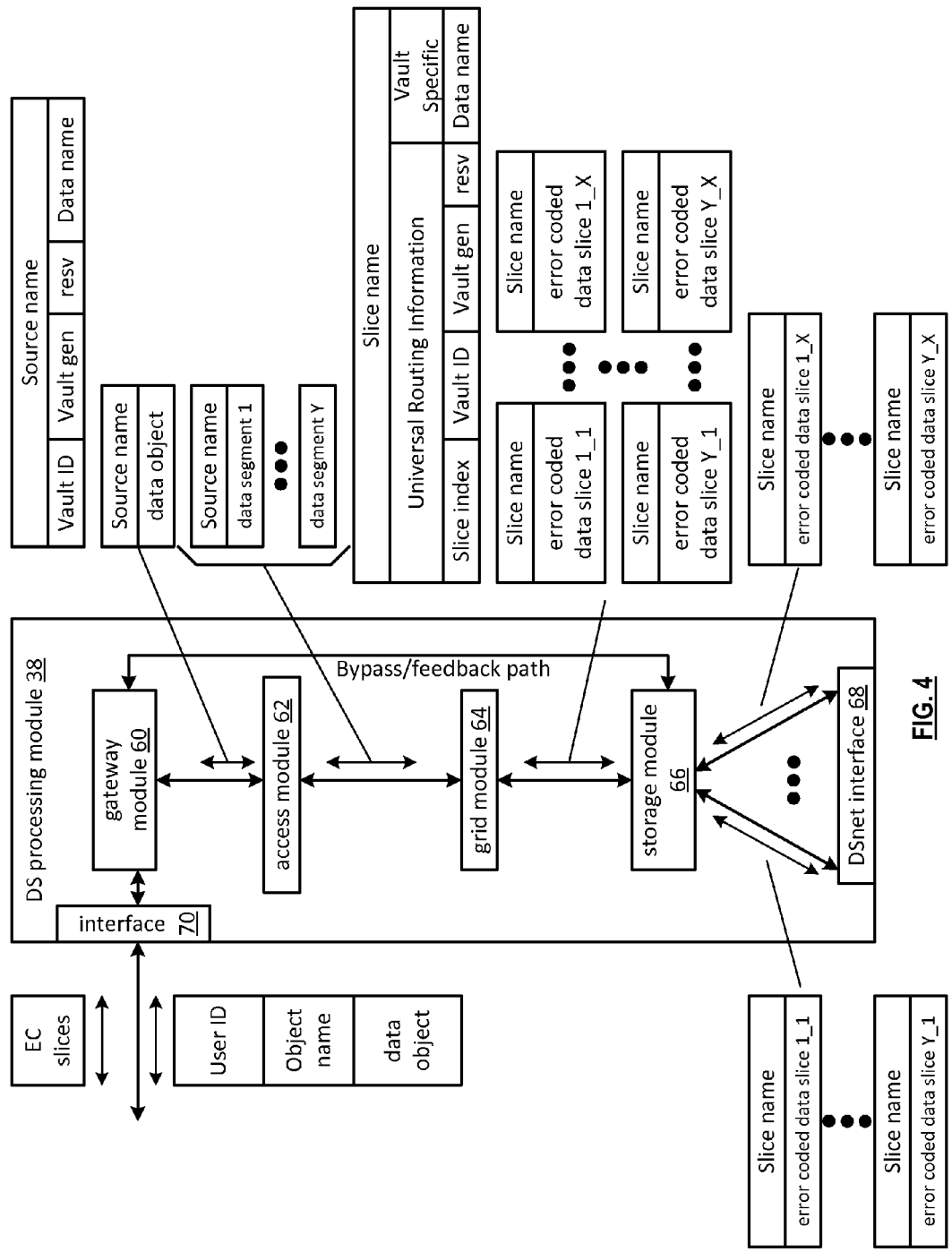
FIG. 4 is a schematic block diagram of an embodiment of a dispersed storage (DS) processing module in accordance with the invention.

FIG. 4 is a schematic block diagram of an embodiment of a dispersed storage (DS) processing module 38 of user device 12 and/or of the DS processing unit 14. The DS processing module 38 includes a gateway module 60, an access module 62, a grid module 64, a storage module 66, and a bypass/feedback path. The DS processing module 38 may also include an interface 70 (e.g., interface 28) and the DSnet interface 68 or the interfaces 68 and/or 70 may be part of user 12 or of the DS processing unit 14.

In an example of storing data, the gateway 60 of the DS processing module 38 receives an incoming data object (e.g., a data file, a data block, an EC data slice, etc.), authenticates the user associated with the data object, obtains user information of the authenticated user, and assigns a source name to the data object in accordance with the user information. To authenticate the user, the gateway module 60 verifies the user ID 30 with the managing unit 18 and/or another authenticating unit. If the user ID is verified, the gateway module 60 retrieves the user information from the managing unit 18, the user device, and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 44. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 60 determines the source name to associate with the data object based on the vault identifier and the data object. For example, the source name may contain a data name (block number or a file number), the vault generation number, the reserved field, and the vault identifier. The data name may be randomly assigned but is associated with the user data object.

The gateway module 60 may utilize the bypass/feedback path to transfer an incoming EC data slice to another DS storage unit 44 when the DS processing module 38 determines that the EC data should be transferred. The determination process will be described in greater detail with reference to one or more of FIGS. 5-17. Alternatively, or in addition to, the gateway module 60 may use the bypass/feedback path to feedback an EC slice for sub-slicing.

The access module 62 receives the data object and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1, 024. Note that each segment is associated with the source name.

The grid module 64 may pre-manipulate (e.g., compression, encryption, cyclic redundancy check (CRC), etc.) the data segment before creating X error coded data slices for each data segment. The grid module 64 creates XY error coded data slices for the Y data segments of the data object. The grid module 64 adds forward error correction bits to the data segment bits in accordance with an error coding algorithm (e.g., Reed-Solomon, Convolution encoding, Trellis encoding, etc.) to produce an encoded data segment. The grid module 64 determines the slice name and attaches the unique slice name to each EC data slice.

The number of pillars, or slices X per data segment (e.g., X=16) is chosen as a function of the error coding objectives. The DS processing module 58 may utilize different error coding parameters for EC data slices and EC data sub-slices based on guidance from one or more of a user vault (e.g., stored parameters for this user), a command from the DS managing unit or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit can compensate for X−T (e.g., 16−10=6) missing error coded data slices per data segment.

The grid module 64, which will be described in greater detail with reference to FIGS. 5 and 6, receives each data segment 1-Y and, for each data segment generates X number of error coded (EC) slices using an error coding function. The grid module 64 also determines the DS storage units 44 for storing the EC data slices based on a dispersed storage memory mapping associated with the user's vault and/or DS storage unit 44 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system.

The storage module 66 may perform integrity checks on the EC data slices and then transmit the EC data slices 1 through X of each segment 1 through Y to the DS Storage units. The DS storage units 44 may store the EC data slices and locally keep a table to convert virtual DSN addresses into physical storage addresses. Alternatively, the DS storage units 44 may create EC data sub-slices of an EC data slice and re-disperse the EC data sub-slices to other DS storage units 44. Note that the number of DS storage units 44 is equal to or greater than the number of pillars (slices X per segment) so that no more than one error coded data slice of the same data segment is stored on the same DS storage unit 44. Further note that EC data slices of the same pillar number but of different segments (e.g., EC data slice 1 of data segment 1 and EC data slice 1 of data segment 2) may be stored on the same or different DS storage units 44.

In an example of a read operation, the user device 10 sends a read request to the DS processing unit 14, which authenticates the request. When the request is authentic, the DS processing unit 14 sends a read message to each of the DS storage units 44 storing slices of the data object being read. The slices are received via the DSnet interface 68 and processed by the storage module 66, which performs a parity check and provides the slices to the grid module 64. The grid module 64 de-slices the slices of a data segment to reconstruct the data segment. The access module reconstructs the data object from the data segments and the gateway module formats the data object for transmission to the user device.

Figure 5:
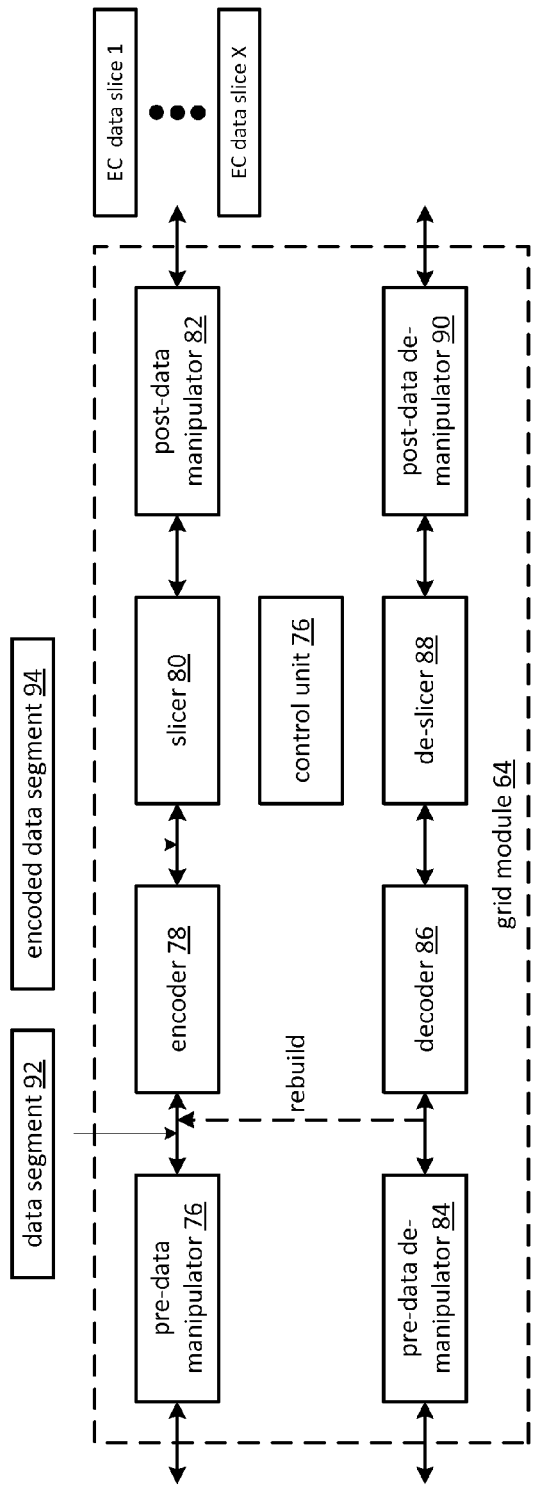
FIG. 5 is a schematic block diagram of an embodiment of a grid module in accordance with the invention.

FIG. 5 is a schematic block diagram of an embodiment of a grid module 64 that includes a control unit 76, a pre-data manipulator 76, an encoder 78, a slicer 80, a post-data manipulator 82, a pre-data de-manipulator 84, a decoder 86, a de-slicer 88, and/or a post-data de-manipulator 90. Note that the control unit 76 may be partially or completely external to the grid module 64. For example, the control unit 76 may be part of the computing core at a remote location, part of a user device, part of the DS managing unit 18, or distributed amongst one or more DS storage units.

In an example of write operation, the pre-data manipulator 76 receives a data segment 92 and a write instruction from an authorized user device. The pre-data manipulator 76 determines if pre-manipulation of the data segment 92 is required and, if so, what type. The pre-data manipulator 76 may make the determination independently or based on instructions from the control unit 76, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 76 manipulates the data segment 92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to enhance the value of the data segment 92.

The encoder 78 encodes the pre-manipulated data segment 92 using a forward error correction (FEC) encoder to produce an encoded data segment 94. The encoder 78 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 78 may use a different encoding algorithm for each data segment 92, the same encoding algorithm for the data segments 92 of a data object, or a combination thereof.

The resulting encoded data segment 94 is of greater size than the data segment 92 by the overhead rate of the encoding algorithm by a factor of $d*(X/T)$, where d is size of the data segment 92, X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 80 transforms the encoded data segment 94 into EC data slices in accordance with the slicing parameter from the vault for this user and/or data segment 92. For example, if the slicing parameters are X=16, then the slicer slices each encoded data segment 94 into 16 encoded slices.

The post-data manipulator 82 performs, if enabled, post-manipulation on the encoded slices to produce the EC data slices. The post-data manipulator 82 may be enabled if it determines that post-data manipulation is required. If required, the post-data manipulator 82 determines the type of post-manipulation. The determinations may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 90 receives at least a read threshold number of EC data slices and performs the inverse function of the post-data manipulator 82 to produce a plurality of encoded slices. The de-slicer 88 de-slices the encoded slices to produce an encoded data segment 94. The decoder 86 performs the inverse function of the encoder 78 to recapture the data segment 92. The pre-data de-manipulator 84 performs the inverse function of the pre-data manipulator 76 to recapture the data segment.

Figure 6:
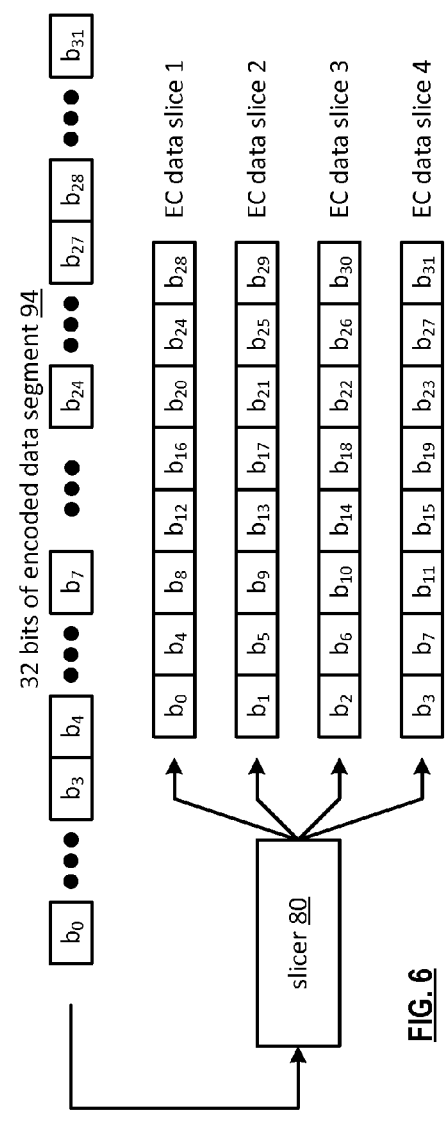
FIG. 6 is a diagram of an example embodiment of error coded data slice creation in accordance with the invention.

FIG. 6 is a diagram of an example of slicing an encoded data segment 94 by the slicer 80. In this example, the encoded data segment includes thirty-two bits, but may include more or less bits. The slicer 80 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 7:
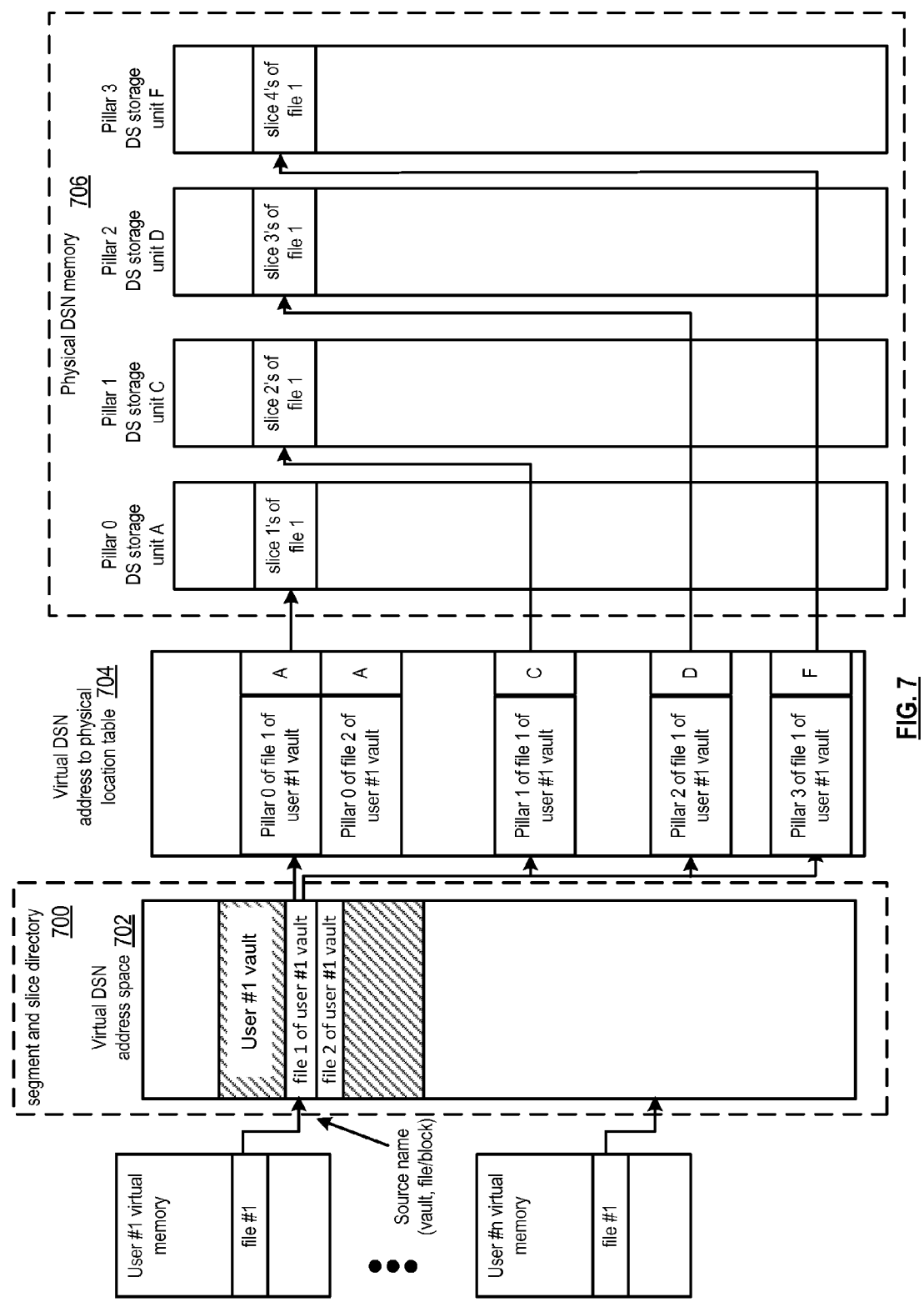
FIG. 7 is a schematic block diagram of an embodiment of a file system hierarchy in accordance with the invention.

FIG. 7 is a schematic block diagram of an embodiment of a file system hierarchy including a plurality of user virtual memories 1-n, a segment and slice directory 700, a virtual dispersed storage network (DSN) address to physical location table 704, and a physical dispersed storage network (DSN) memory 706. The file system hierarchy may be utilized to translate the user virtual memory system to the physical DSN memory 706 by translating the user virtual memory address into a virtual dispersed storage network (DSN) address space 702 and then to the physical DSN memory 706. The segment and slice directory 700 comprises the virtual DSN address space 702 and the physical DSN memory 706 includes a plurality of DS storage units A-F. In an example, where there are four pillars, there are four slices created for each data segment of the Y segments. Pillars can be allocated to more than one DS storage unit, but a given DS storage unit is not assigned to store more than one pillar from a given user to improve system robustness (e.g., avoiding DS storage unit failures).

In an embodiment, one of the plurality of user virtual memories utilizes a native OS file system to access the segment and slice directory 700 by including source name information in any request such as read, write, delete, list, etc. A source name vault identifier and a file/block name may index into the segment and slice directory 700 to determine the virtual DSN address space 702. A unique virtual vault is associated with each user and may contain user attributes (e.g., user identification, billing data, etc.), operational parameters, and a list of the DS storage units that may be utilized to support the user. One or more vaults may be established from the same set of DS storage units in different combinations. A vault identifier is utilized to distinguish between vaults. For example, vault 1F (for user 1) may utilize DS storage units 3, 10, 31, 46, 52, 55, 65, and 68 (X=8 wide) (not illustrated), while vault 3F (user 2) may utilize DS storage units 3, 8, 31, 26, 40, 45, 46, 49, 55, 57, 58, 60, 62, 63, 68, and 72 (X=16 wide) (not illustrated).

In an example embodiment, the total virtual DSN address space 702 is defined by a forty eight byte identifier, thus creating $256^{48}$ possible slice names. The virtual DSN address space 702 accommodates addressing all EC data slices of every segment of every data object (e.g., data file, blocks, streams) of every generation, of every user vault. The slice name is a virtual DSN address and remains the same even as different DS storage units are added or deleted from the physical DSN memory 706.

A user has a range of virtual DSN addresses assigned to their vault. In one embodiment, the virtual DSN addresses typically do not change over the operational lifespan of the system for that particular user. In another embodiment, the virtual DSN address space 702 is dynamically altered from time to time to provide potential benefits including improved security and expansion, or retraction, capability. A virtual DSN address space security algorithm may alter the virtual DSN address space 702 according to one or more of a command (e.g., from the DS managing unit), a schedule, a detected security breach, or any other trigger. The virtual DSN address may also be encrypted in use thus requiring encryption and decryption steps whenever the virtual DSN address is used, in accordance with the security parameters.

The index into the virtual DSN address space 702 by vault and file name may create the slice names (virtual DSN addresses) to use as an index into the virtual DSN address to physical location table 704. In an embodiment, the virtual DSN address to physical location table 704 is sorted by vaults and pillars so that the subsequent addresses are organized by pillar of all the file segments that have EC data slices with the same slice identifier and hence are typically stored at the same DS storage unit. The output of the access to the virtual DSN address to physical location table 704 is the DS storage unit identifiers.

The slice names may be used as the virtual index to the memory system of each DS storage unit to gain access the physical address of the EC data slices. In an embodiment, the DS storage unit maintains a local table correlating slice names (virtual DSN address) to the addresses of the physical media internal to the DS storage unit.

In an example, user number 1 has a vault identified operational parameter of four pillars and pillar 0 is mapped to DS storage unit A, pillar 1 is mapped to DS storage unit C, pillar 2 is mapped to DS storage unit D, and pillar 3 is mapped to DS storage unit F. The grid module 64 of a storage integrity processing unit 16 may be assigned to periodically scan for data errors across the DSN address ranges of the four pillars of the user 1 vault. The scanning may be centralized (e.g., all in the storage integrity processing unit) or distributed amongst DS storage units, the DS managing unit 18, the DS processing unit 14, or the user devices 10 and 12.

Figure 8:
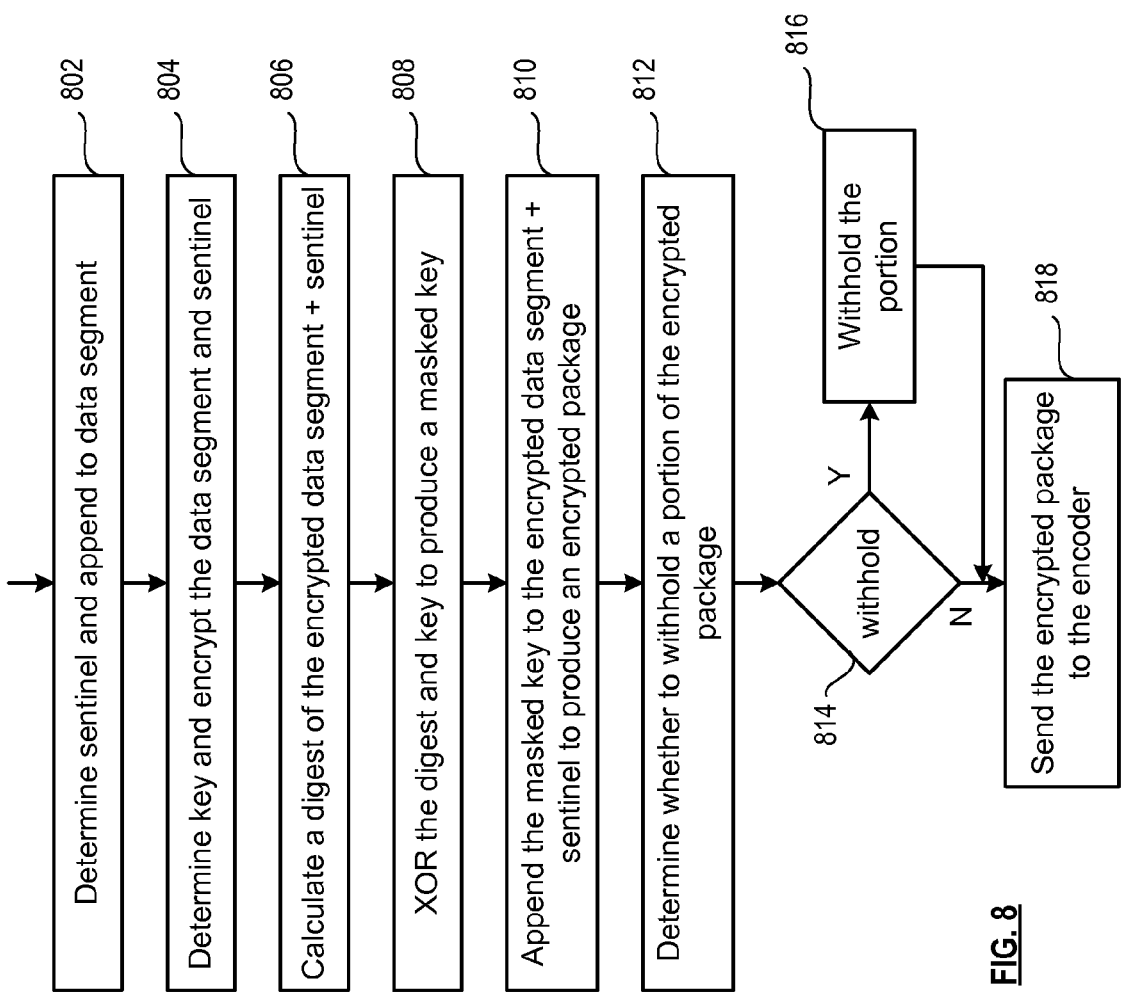
FIG. 8 is a logic diagram of an embodiment of a method for securing data in accordance with the present invention.

FIG. 8 is a logic diagram of an embodiment of a method for securing data in where the pre-data manipulator 76 may produce an encrypted data segment for the incoming data segment. The pre-data manipulator may be part of one or more of the storage integrity processing unit, the DS storage unit, the DS managing unit, the DS processing unit, and/or the user device.

The pre-data manipulator 76 may receive the data segment 92 to be encrypted from the access module 62. The pre-data manipulator 76 may pre-encrypt the data segment 92 utilizing a secret stored private key prior to the following sequence. As illustrated by block 802, the pre-data manipulator 76 determines a sentinel value and appends the sentinel to the data segment prior to any pre-encryption. The determination of the sentinel value may be based on one or more of the security parameters associated with the user vault, a DSN-wide security parameter, a unique number associated with each data segment, and/or an encrypted number. In some embodiments, the sentinel can be chosen as the message digest of a hash function, or similar integrity verification function of the input data. The sentinel value may also include padding, which can ensure some minimum size of a secure package, e.g. at least as big as the key used to encode the package. Ensuring a minimum size can help prevent a package, from being broken by brute force. The sentinel value may be a sixteen byte number that may be utilized to verify the integrity of the data segment when it is retrieved from the DSN.

As illustrated by block 804, the pre-data manipulator 76 may determine a key and may encrypt the data segment and sentinel utilizing the key and an encryption algorithm that may be specified by the security parameters. The determination of the key may include one or more of a random key number, a key stored in the security parameters, a key generator based on the segment number, a random key number based on a seed from the security parameters, a key generator based on a portion of the data segment, and/or a key embedded in the data segment. The key may be sixteen (128 bits), thirty two (256 bits), or some other number of bytes.

As illustrated by block 806, the pre-data manipulator may calculate a digest of the encrypted data segment and sentinel. The digest may be a CRC32 hash. As illustrated by block 808, the pre-data manipulator may exclusive OR (XOR) the digest and the key to produce a masked key. The pre-data manipulator may append the masked key to the encrypted data segment and sentinel to produce an encrypted package, as shown by block 810.

As illustrated by block 812, the pre-data manipulator 76 may determine whether to withhold a portion of the encrypted package, and if so, how big a portion (e.g., how many bits), and from what section of the encrypted package. The determination may be based on one or more of the security parameters, the user ID, a metadata field associated with the data object that indicates the digital rights management (DRM) status (e.g., copyrighted content, restricted access content, open content with no restrictions), the data segment number, and/or a metadata field associated with the data object that indicates the type of data (e.g., text object, sound object, video object, multimedia object). For example, the determination may indicate to withhold a thirty three byte portion starting at byte 100 (e.g., a number generated from the data segment number) with a greater number of bits than the key (e.g., 32 bytes) to provide at least as much security as the key to defend against defeating the encryption.

As illustrated by block 814, the pre-data manipulator 76 may withhold the portion of the encrypted package in accordance with the determination when the determination indicates the portion is to be withheld. As illustrated by block 818, the pre-data manipulator 76 may send the encrypted package to the encoder when the determination to withhold a portion of the encrypted package indicates the portion is not to be withheld. As illustrated by block 816, the pre-data manipulator 76 may save the withheld portion of the encrypted package when the determination to withhold a portion of the encrypted package indicates the portion is to be withheld. The pre-data manipulator 76 may save the withheld portion of the encrypted package in one or more of a common local file for all the withheld portions of each data segment of the data object, in a series of local files where each file contains one withheld portion for one data segment, in one or more stores in the DSN memory, in one or more stores in one or more of the DS managing unit 18, the storage integrity processing unit 16, the DS processing unit 14, and/or the in the user devices 10 and 12. The pre-data manipulator 76 may pad the section of the encrypted package where the withheld portion was removed with zeros, ones, or a random number shrink the size of the encrypted package by size of the withheld portion, or send the encrypted package to the encoder as further illustrated by block 818.

Figure 9:
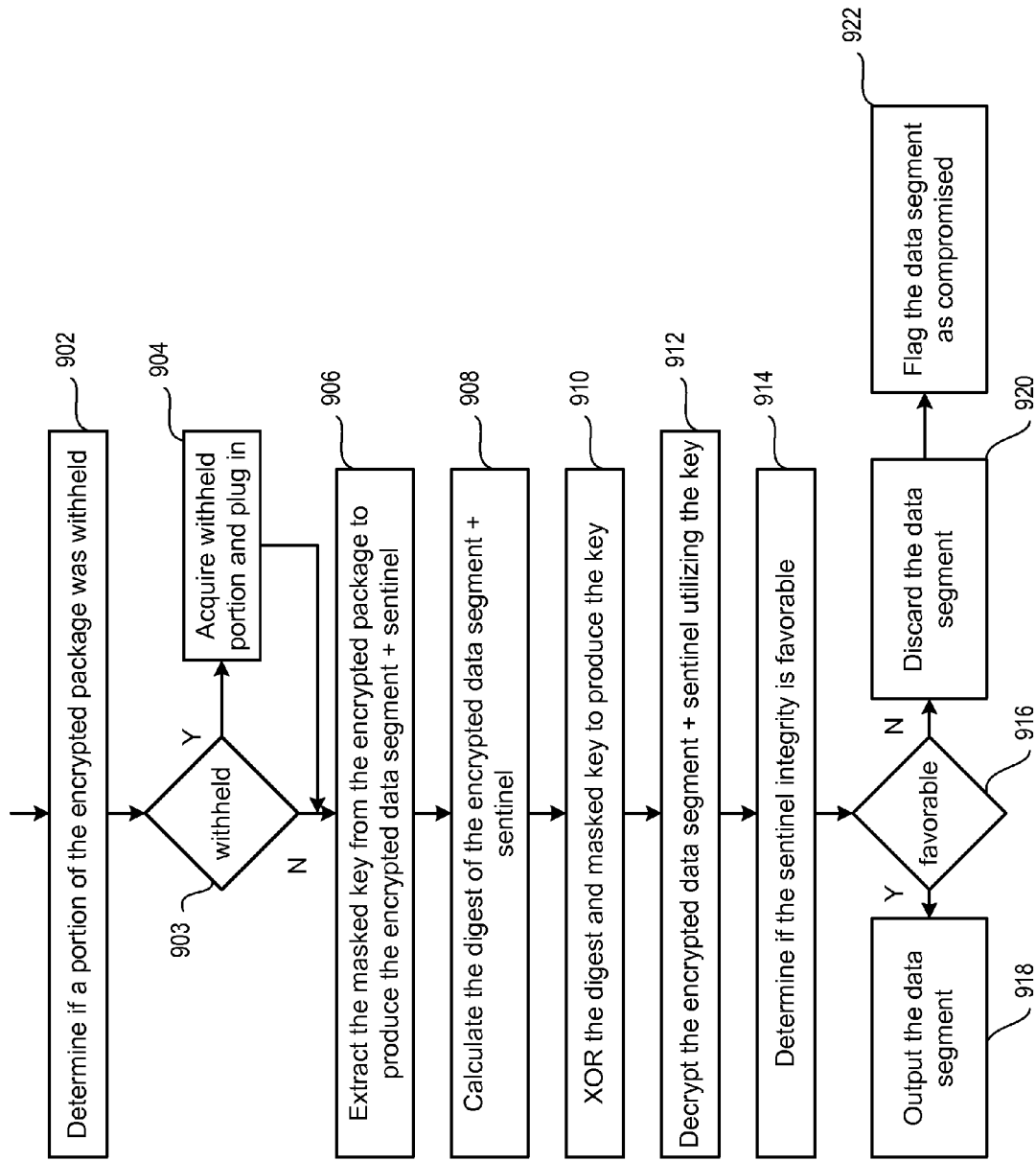
FIG. 9 is a logic diagram of another embodiment of a method for securing data in accordance with the present invention.

FIG. 9 is a logic diagram of another embodiment of a method for securing data in where the pre-data de-manipulator 84 may produce the data segment for the incoming encrypted package in a retrieval sequence. The pre-data de-manipulator 84 may be part of one or more of the storage integrity processing unit 16, the DS storage unit, the DS managing unit 18, the DS processing unit 14, and/or the user devices 10 and 12.

The pre-data de-manipulator 84 may receive a decoded encrypted package to be decrypted from the decoder 86. As illustrated by block 902, the pre-data de-manipulator 84 may determine whether a portion of the decoded encrypted package was withheld, and if so, how big a portion (e.g., how many bits), and from what section of the encrypted package. The determination may be based on one or more of a flag in the decoded encrypted package, the security parameters, the user ID, a metadata field associated with the data object that indicates the digital rights management (DRM) status (e.g., copyrighted content, restricted access content, open content with no restrictions), the data segment number, and/or a metadata field associated with the data object that indicates the type of data (e.g., text object, sound object, video object, multimedia object). For example, the determination may indicate that a thirty three byte portion starting at byte 100 (e.g., a number generated from the data segment number) was withheld.

As illustrated by block 903, the pre-data de-manipulator 84 may acquire the withheld portion of the decoded encrypted package in accordance with the determination when the determination indicates that a portion was withheld, as shown by block 904. The pre-data de-manipulator 84 may acquire the withheld portion from one or more of a real-time and/or static feed from a source, the common local file for all the withheld portions of each data segment of the data object, the series of local files where each file contains one withheld portion for one data segment, the one or more stores in the DSN memory, the one or more stores in one or more of the DS managing unit 18, the storage integrity processing unit 16, the DS storage unit, the DS processing unit 14, and/or the user devices 10 and 12. The acquisition of the withheld portion will be discussed in greater detail with reference to FIG. 10.

As illustrated by block 904, the pre-data de-manipulator 84 may add the acquired withheld portion back to the decoded encrypted package to produce the encrypted package when the portion was withheld. As illustrated by block 903, the pre-data de-manipulator 84 may make the decoded encrypted package the encrypted package when no portion was withheld.

As illustrated by block 906, the pre-data de-manipulator 84 may extract the masked key from the encrypted package to produce the masked key and the encrypted data segment and sentinel. As shown by block 908, the pre-data de-manipulator 84 may calculate the digest of the encrypted data segment and sentinel. The digest may be a CRC32 hash. The pre-data de-manipulator may exclusive OR (XOR) the digest and the masked key to produce the key, as illustrated by block 910.

As illustrated by block 912, the pre-data de-manipulator may decrypt the encrypted data segment and sentinel to produce the data segment and decrypted sentinel utilizing the key and the encryption algorithm that may be specified by the security parameters. As illustrated by block 914, the pre-data de-manipulator may determine if the decrypted sentinel integrity is favorable by comparing the decrypted sentinel with the sentinel. The pre-data de-manipulator may determine a favorable comparison when the decrypted sentinel and the sentinel are identical.

As illustrated by blocks 920 and 922, the pre-data de-manipulator 84 may discard the data segment and flag the data segment as compromised when the sentinel integrity is not favorable. The pre-data de-manipulator may send the flag to one or more of the access module 62, the DS processing unit 14, the storage integrity processing unit 16, the user device 10 or 12, and/or the DS storage unit, such that the EC data slices for the compromised data segment may be rebuilt and re-dispersed and stored.

Figure 10:
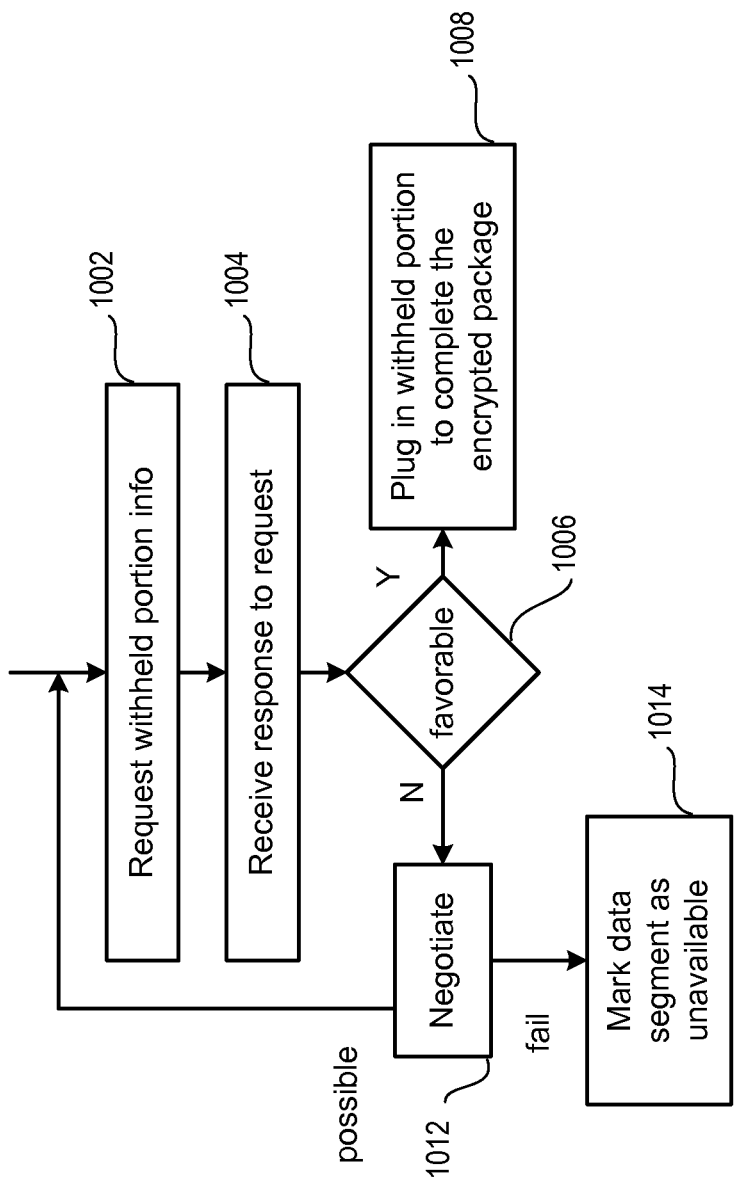
FIG. 10 is a logic diagram of another embodiment of a method for securing data in accordance with the present invention.

FIG. 10 is a logic diagram of another embodiment of a method for securing data where the pre-data de-manipulator 84 may acquire the withheld portion of the decoded encrypted package. As shown by block 1002, the pre-data de-manipulator 84 may request the withheld portion for the decoded encrypted package for the data segment. The pre-data de-manipulator 84 may send the withheld portion request to one or more of an outside source (e.g., service provider server), the DS managing unit 18, the storage integrity processing unit 16, the DS processing unit 14, the DS storage unit, and/or the user device 10 or 12.

As illustrated by block 1004, the pre-data de-manipulator 84 may receive a response to the withheld-portion-request, and determine if the response is favorable. As illustrated by block 1006, the pre-data de-manipulator 84 may determine the response is favorable when the request is approved and at least one withheld portion (e.g., for one data segment) is received. The pre-data de-manipulator 84 may receive more than one withheld portion in the response. The pre-data de-manipulator 84 may decrypt the received withheld portion when the received withheld portion is encrypted. For example, the source may utilize a private key and the pre-data de-manipulator may utilize a public key where the private and public keys are paired. As illustrated by block 1008, the pre-data de-manipulator 84 may complete the decoded encrypted package utilizing the withheld portion to produce the encrypted package that may now be decrypted as described with reference to FIG. 9.

As further illustrated by block 1006, the pre-data de-manipulator may determine the response is not favorable when the request is denied. As illustrated by block 1012, the pre-data de-manipulator may negotiate with the source to obtain the withheld portion. The pre-data de-manipulator may receive conditions to be met including one or more of a guarantee to only cache a limited number of data segments and never all the data segments of the data object (e.g., never an entire movie), access payment resolution, a wait period (e.g., how long until data segments may be enabled via providing the corresponding withheld portions), access permissions resolution, and/or authentication resolution. The pre-data de-manipulator may re-request the withheld portion when the negotiation process is still viably active. The pre-data de-manipulator may end the negotiations if one or more of the following occurs including the withheld portion has not been received within a timeframe during the negotiations, and/or the pre-data de-manipulator receives a final denial from the source. As illustrated by block 1014, the pre-data de-manipulator may mark the data segment as unavailable when the pre-data de-manipulator ends the negotiations without receiving the withheld portion.

Figure 11:
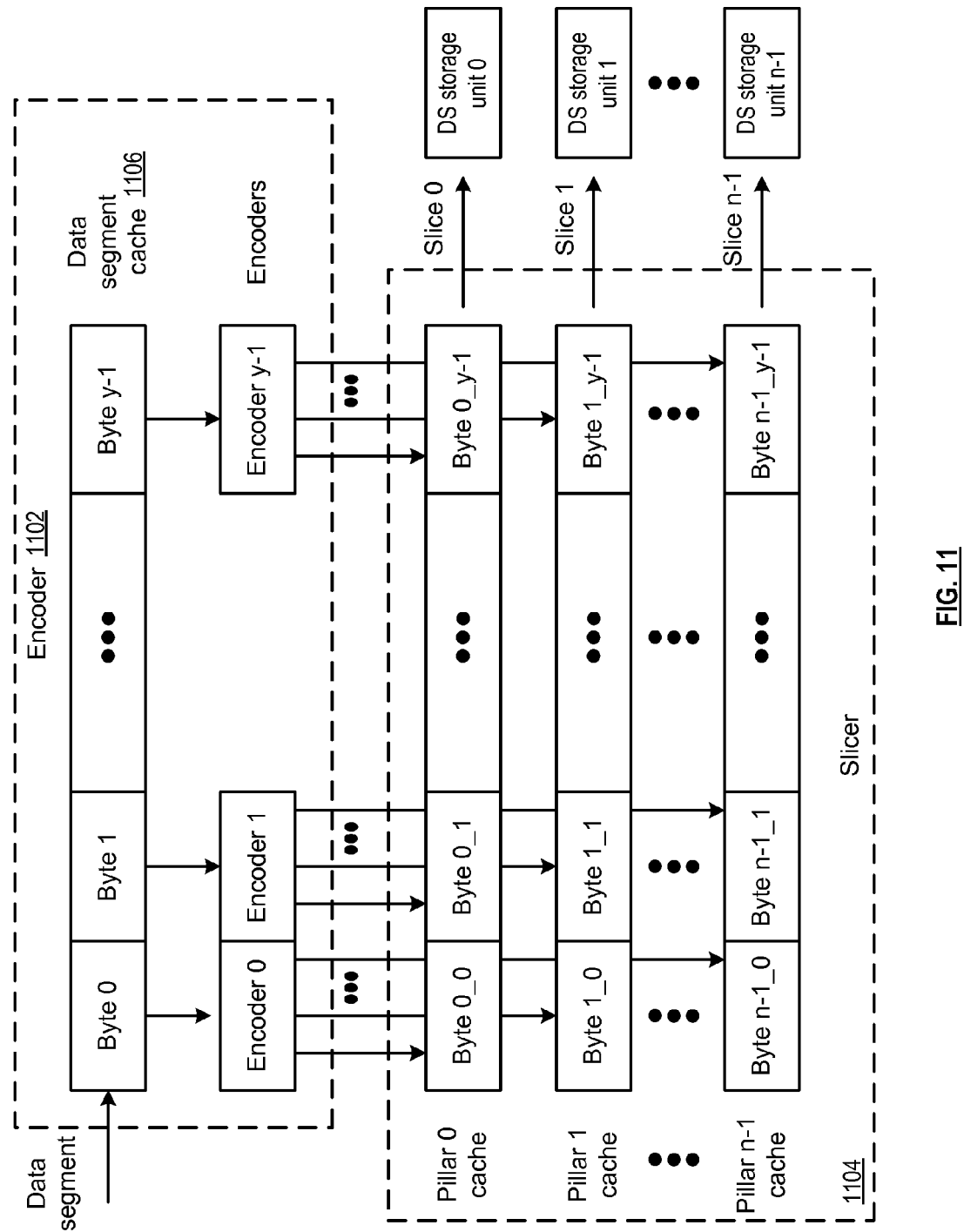
FIG. 11 is a schematic block diagram of an embodiment of an encoder and slicer in accordance with the invention.

FIG. 11 is a schematic block diagram of an embodiment of an encoder and slicer that includes an encoder 1102 and a slicer 1104. The encoder 1102 may include a data segment cache 1106 and a plurality of y encoders (0 through y−1). The slicer 1104 may include a plurality of n pillar caches (0 through n−1). The data segment cache 1106 may accommodate y bytes of the data segment. The data segment may contain one or more of a portion of the user data object, the security parameters, a key used to encrypt the data segment, and or other system data. The pillar cache may accommodate y bytes of the EC data slice.

The encoder 1102 may receive the data segment and store the data segment in the data segment cache 1106. Each encoder 0 through y−1 may encode the corresponding byte in the data segment cache into n bytes of the corresponding byte in each of the pillar caches 0 through n−1. For example, encoder 1 may encode data segment cache byte 1 into byte 0_1 (byte 1 of pillar cache 0), byte 1_1 (byte 1 of pillar cache 1), byte 2_1 (byte 1 of pillar cache 2), and so forth in a similar fashion up to byte n−1_1 (byte 1 of pillar cache n−1).

The encoders 0 through y−1 may determine to utilize the same or different encoding algorithms for every data segment byte 0 through y−1. The encoder 1102 may utilize finite field arithmetic to encode the data segment byte. The determination may be based on an encoding parameter in the user vault, an encoding parameter stored in the DSN, a command from the user device 10 or 12, a command from the DS managing unit 18, a data type indicator, and/or a security requirement. For example, the encoder 1102 may determine to utilize a straight line equation of the form y=mx+b for byte 1 based on the user vault. The encoder 1 may utilize m as the data segment byte 1 to be encoded, (e.g. the secret) and choose the coefficients for the other terms in the equation through a random or pseudorandom process, in this case b is chosen randomly, the pillar number (or pillar number+1) as x, producing y as the byte stored in the pillar cache. In another example, the encoder may determine to utilize an equation of the form y=ax$^2$+bx+c based on the user vault. The encoder utilization of the encoding algorithm will be discussed in greater detail with reference to FIG. 12.

The slicer 1104 may receive the encoded bytes from the encoder 1102 and arrange the bytes in each of the pillar caches 0 through n−1. The slicer 1104 may send the contents of each pillar cache as the slices to be stored in DS storage units 0 through n−1. The encoder and slicer may store n*y bytes for each y byte data segment, as opposed to (n/k)*y bytes for a Reed Solomon encoder described with reference to FIG. 4. The encoder and slicer may be specified in the security parameters for use to encode and slice smaller amounts of data including one or more of keys, metadata, and/or security parameters.

The corresponding de-slicer and decoder work in the opposite fashion where the pillar caches receive EC data slices from the DSN memory, a plurality of decoders decode the same bytes from the pillar caches to produce the corresponding data segment byte. An example of operation is discussed with reference to FIGS. 12 and 13.

The encoder 1102 produces EC data slices where no EC data slice by itself has the secret data byte, but as a whole they share the secret in a shared secret fashion. In the example, the encoder utilizes the y=mx+b algorithm such that only two data slice bytes of the same byte are required to decode the original data byte since two points of a line (e.g., x1y1, x2y2) fully describe the line and the slope m (the secret). The decoders only require the same corresponding two bytes (e.g., byte 0_1 and byte 1_1, or byte 5_1 and byte 10_1) from any two slices, not all the bytes (0 through y−1) of two slices to produce data segment byte 1.

Figure 12:
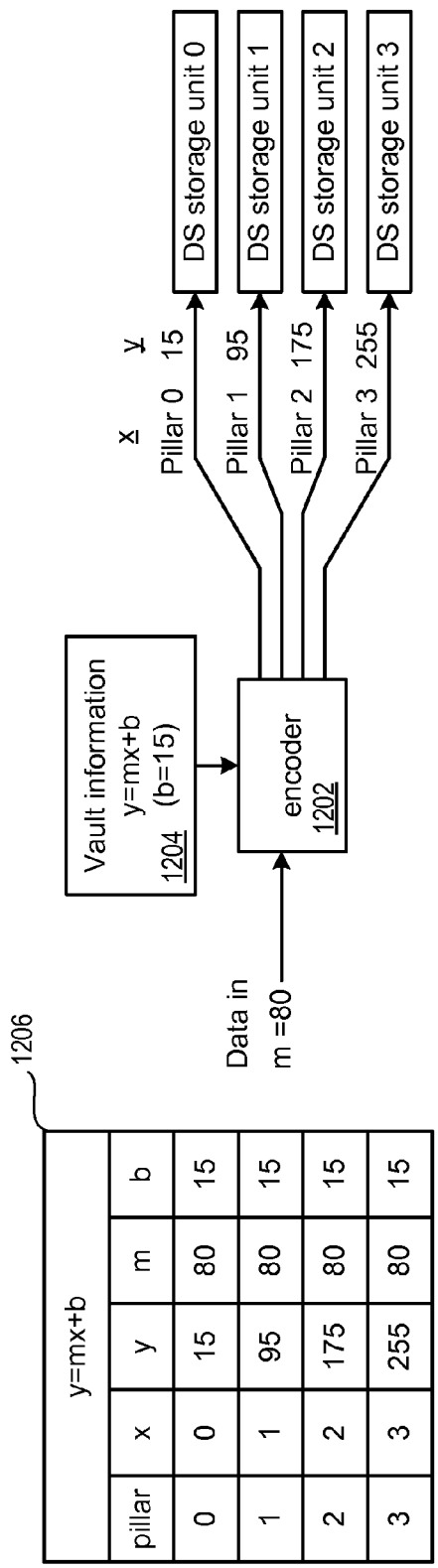
FIG. 12 is an example of an embodiment of an encoder in accordance with the invention.

FIG. 12 is an example of an embodiment of an encoder 1202 that receives data in and vault information 1204 to produce pillar data to store in the DS storage unit in a shared secret fashion. In an example of operation, the encoder 1202 receives an input byte with a value of 80 from the data segment cache. The encoder may access the vault information 1204 to determine the type of encoding algorithm from the security parameters, to utilize to encode the input byte.

In the example, the pillar width n is four such that encoder 1202 may produce four slices of data for storage. The encoder 1202 may start with pillar 0 and set x=0 for the equation y=mx+b. The encoder 1202 may set m=80 for the input byte (the secret) and may utilize b=15 or any other constant such that y is bound by 0 to 255 for the 8 bit byte y. The encoder 1202 may utilize the same value for b across the four pillars for this input byte and may utilize a different value for b for the next four pillars for the next byte. The value for b may be predetermined or random. The value for b may not be stored to improve the system integrity. The encoder 1202 may calculate the pillar 0 value of y=mx+b for this input byte 80 as y=80*0+15=15.

The encoder 1202 may calculate the value of y for each pillar including pillar 1 where y=80*1+15=95, pillar 2 where y=80*2+15=175, and pillar 3 where y=80*3+15=255. The encoder 1202 may provide the four values of y for storage to the DS storage units.

Figure 13:
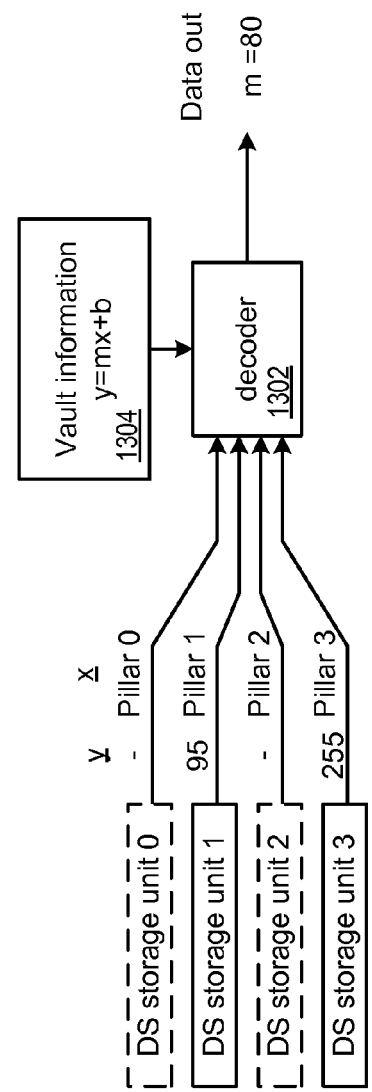
FIG. 13 is an example of an embodiment of a decoder in accordance with the invention.

FIG. 13 is an example of an embodiment of a decoder 1302 that receives slices from one or more DS storage unit pillars and obtains security parameters from vault information 1304 to produce the data segment byte in a shared secret fashion. In an example of operation, the decoder 1302 receives slices from DS storage units 1 and 3 (but not from DS storage units 0 and 2). The decoder 1302 may access the vault information 1304 to determine the type of decoding algorithm (e.g., y=mx+b) from the security parameters, to utilize to decode the slices to produce the data segment byte. The decoder 1302 receives 95 from pillar 1 and 255 from pillar 3.

The decoder 1302 constructs two equations and two unknowns to solve for the unknowns m and b. The decoder 1302 forms the equations in the form of y=mx+b.

$$95 = m*1 + b \qquad \text{Equation 1}$$

$$255 = m*3 + b \qquad \text{Equation 2}$$

The decoder 1302 solves the equations to determine that b=15 and m=80 (the secret data byte). The decoder 1302 may verify the integrity of the received data slice bytes when receiving at least one more byte than is minimally required to decode the secret byte. In the example, the decoder 1302 may verify the integrity of the received data slices when receiving three or four bytes. The decoder 1302 may verify the integrity by comparing the results from solving for the two unknowns in every way possible. The decoder 1302 may determine a favorable integrity when the decoder 1302 arrives at the same solution in every case (e.g., always produce 80 from any two bytes of the four pillar bytes). The decoder 1302 caches the data byte output in the data segment cache.

Figure 14:
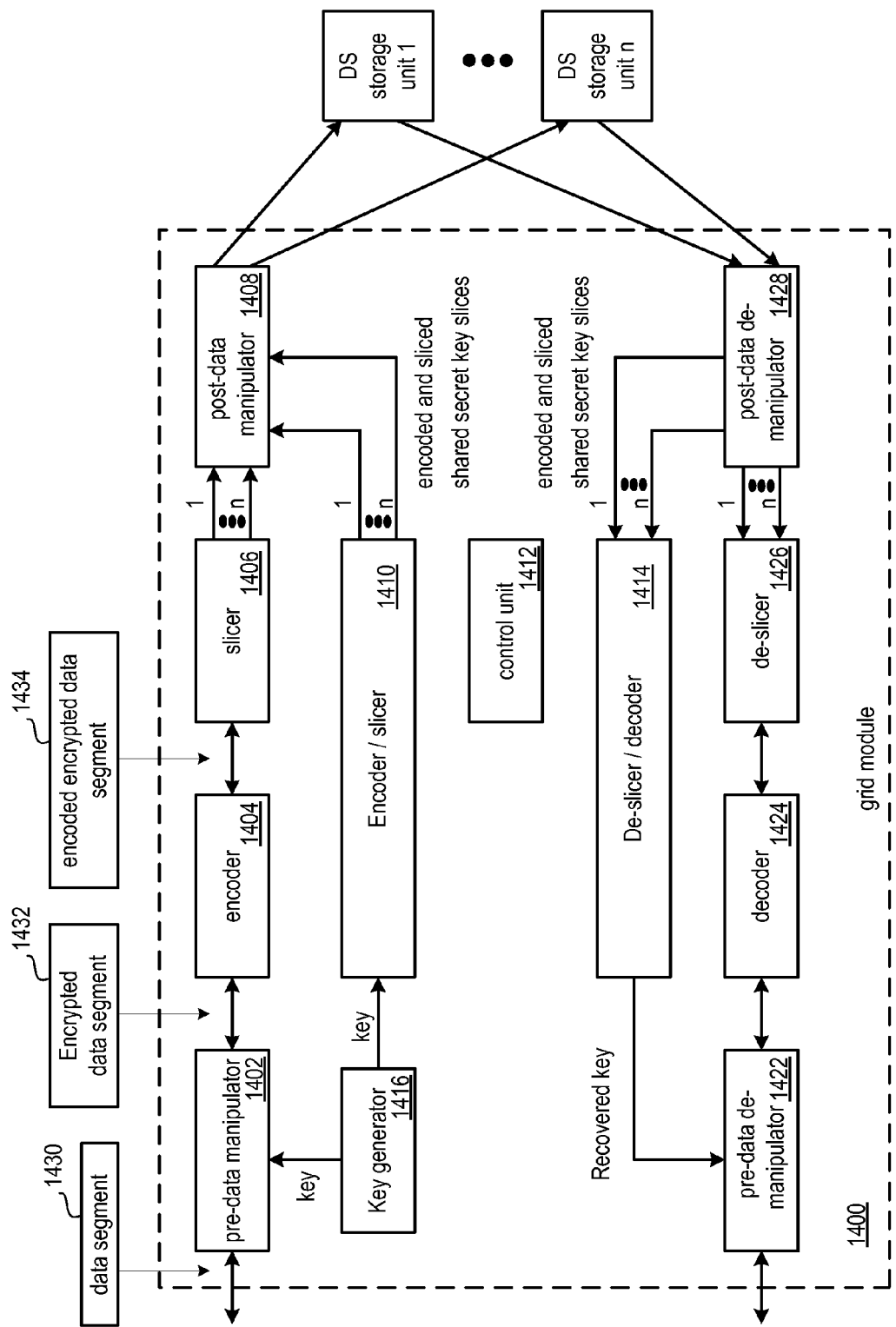
FIG. 14 is a schematic block diagram of another embodiment of a grid module in accordance with the invention.

FIG. 14 is a schematic block diagram of another embodiment of a grid module 1400 that includes a key generator 1416, an encoder/slicer 1410, a de-slicer/decoder, the control unit 1412, the pre-data manipulator 1402, the encoder 1404, the slicer 1406, the post-data manipulator 1408, the pre-data de-manipulator 1402, the decoder 1424, the de-slicer 1426, and the post-data de-manipulator 1428. In another embodiment, the control unit 1412 is partially or completely external to the grid module 1400. For example, the control unit 1412 may be part of the computing core 22 at a remote location, part of a user device 10 or 12, part of the DS managing unit 18 of FIG. 1, or distributed amongst one or more DS storage units.

The control unit 1412 may assist or control the other elements of the grid module 1400 to determine operational parameters which may include what, if any, types of pre-data manipulation/de-manipulation are to be applied to an incoming/outgoing data segments, security parameters, what type of error encoding/decoding to apply to the (encoded) data segments, how to slice/de-slice the encoded data segments/error coded data slices, what, if any, types of post-data manipulation/de-manipulation are to be applied to outgoing/incoming error coded data slices, DS storage memory mapping, status of DS storage units, performance history of DS storage units, capability of DS storage units, prioritization information for DS storage unit usage, and when to rebuild data. The control unit 1412 may determine the operational parameters by combining parameters of the associated vault with other parameters, which will be discussed below.

In an example of operation, the pre-data manipulator 1402 receives the data segment 1430 and a write instruction from an authorized user device. The control unit 1412 or gateway module 60 may assist the pre-data manipulator 1402 to determine the vault for this user and the data segment 1430. The pre-data manipulator 1402 determines if pre-manipulation of the data segment 1430 is required, and if so, what type of pre-manipulation. The determination may be based on one or more factors including the security parameters, a computing system-wide predetermination, a table lookup, vault parameters associated with the user identification, the type of data, security requirements, available DSN memory, performance requirements, and/or other metadata.

The pre-data manipulator 1402 may manipulate the data segment 1430 in accordance with the manipulation determination. The manipulation may include one or more of compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, key information, file type, etc.), cyclic redundancy check (e.g., CRC32), and/or other manipulations to enhance the value of the data segment. Note that the pre-data de-manipulator 1422 performs the complementary functions of the pre-data manipulator 1402 when data is retrieved from the DSN memory.

The pre-data manipulator 1402 may utilize a key from the key generator 1416 when the pre-data manipulator 1402 encrypts the data segment to produce an encrypted data segment 1432. The key generator 1416 may produce a random key for each data segment 1430.

The encoder 1404 receives the encrypted data segment 1432 from the pre-data manipulator 1430 and encodes the encrypted data segment 1432 using a forward error correction (FEC) encoder to produce the encoded encrypted data segment 1434. The encoder 1404 determines what type of encoding algorithm to use based on factors including one or more of the security parameters, predetermination in the vault for this user and/or data segment, a time based algorithm, user directed, DS managing unit directed, as a function of the data type, as a function of the data segment metadata, and/or any other factor to determine algorithm type. The encoder 1404 may utilize a different encoding algorithm for each data segment, or the same encoding algorithm for all data segments, or some other combination. The encoder 1404 may determine the encoding algorithm type to be one of Golay, Multidimensional parity, Reed-Solomon, Hamming, Bose Ray Chauduri Hocquenghem (BCH), Cauchy-Reed-Solomon, or any other FEC encoder. The encoded encrypted data segment 1434 is of greater size than the data segment 1430 by the overhead rate of the encoding algorithm. The encoded encrypted data segment 1434 is d(X/T), where d is size of the data segment, X is the width or number of slices, and T is the threshold or minimum number of received slices to enable recreation of the data segment. The corresponding decoding process can accommodate at most X−T missing EC data slices and still recreate the data segment. For example, if X=16 and T=10, then the data segment may be recoverable, even if most 6 EC data slices per segment can be corrupted or missing. Note that the decoder 1424 performs the complementary functions of the encoder 1404 when data is retrieved from the DSN memory.

The slicer 1406 receives the encoded encrypted data segment 1434 from the encoder 1404 and transforms the encoded encrypted data segment 1434 into n EC data slices in accordance with the slicing parameter from the vault for this user and/or data segment. In one embodiment, data segments are packed one for one into a data slice. In this instance, it is possible to correct many data slices with this method if the error patterns are substantially manifested as individual bit errors. In another example of this instance, entire slices may be lost and hence entire data segments may not be recoverable. In another embodiment, a data segment is dispersed across many data slices (e.g., X wide pillars) to lessen the impact on a given data segment when an entire data slice is lost. Less data per segment is lost, when a data slice is lost, as the data segment is dispersed across more slices. Note that the de-slicer 1426 performs the complementary functions of the slicer 1406 when data is retrieved from the DSN memory.

The encoder/slicer 1410 receives the key from the key generator 1416 to produce an encoded and sliced shared secret key (as discussed with reference to FIGS. 11-13) with n slices to match the number of EC data slices produced by the slicer.

The post-data manipulator 1408 receives EC data slices from the slicer 1406 and the encoded and sliced shared secret key slices from the encoder/slicer 1410. The post-data manipulator 1408 determines if post-manipulation of the EC data slices is required, and if so, what type of post-manipulation. The determination may be driven by one or more factors including one or more of the security parameters, a computing system-wide predetermination, parameters in the vault for this user, a table lookup, the user identification, the type of data, security requirements, available DSN memory, performance requirements, and/or other metadata. The post-data manipulator 1408 manipulates the EC data slice in accordance with the manipulation determination. The manipulation may include one or more of slice level compression, signatures, encryption, CRC, addressing, watermarking, tagging, adding metadata, and/or other manipulation to improve the effectiveness of the computing system. The post-data manipulator 1408 appends the encoded and sliced shared secret key slices to the EC data slices. The post-data manipulator 1408 passes the resulting EC data slices, with the attached slice name and encoded and sliced shared secret key slices, to the storage module for storage in the DSN memory. Note that the post-data de-manipulator 1428 performs the complementary functions of the post-data manipulator 1408 when data is retrieved from the DSN memory.

In an example of operation, the grid module 1400 may perform a retrieve operation of the data segment previously dispersed stored in DS storage units 1-n. The retrieve process may execute on one or more of the storage integrity processing unit 16, the DS processing unit 14, the DS managing unit 18, the DS storage unit, and/or the user device 10 or 12. The grid module 1400 may determine that a data segment is to be retrieved based on a command from another unit such as the storage integrity processing unit 16, the DS managing unit 18, the DS storage unit, and/or the user device 10 or 12.

The grid module 1400 may retrieve enough EC data slices (e.g., T slices) to de-slice the EC data slices, decode and decrypt the data segment. The grid module 1400 may determine the vault parameters based on the vault identifier in the slice name attached to the retrieve command. The grid module 1400 may utilize the vault parameters to perform the functions including determining which DS storage units to access for each slice, to determine what type of post-data de-manipulation to perform, how to de-slice the EC data slices, how to decode the de-sliced encoded data, and how to de-crypt the data segment to produce the data segment.

The post-data de-manipulator 1428 receives the EC data slices from DS storage units 1-n and separates the EC data slices produced by the slicer 1406 from the encoded and sliced shared secret key slices. The de-slicer/decoder 1414 may retrieve the encoded and sliced shared secret key slices from the post-data de-manipulator 1428 to produce the recovered key in accordance with the shared secret approach as discussed with reference to FIGS. 11-13. The de-slicer 1426 may receive the EC data slices from the post-data de-manipulator 1428 to produce the encoded and encrypted data segment in accordance with the vault parameters (e.g., slicing and de-slicing method). The decoder 1424 may receive the encoded and encrypted data segment from the de-slicer 1426 to produce the encrypted data segment in accordance with the vault parameters (e.g., encoding and decoding algorithm).

The pre-data de-manipulator 1422 may receive the encrypted data segment from the decoder 1424 and utilize the recovered key from the de-slicer/decoder 1414 to produce the data segment in accordance with the vault parameters (e.g., encrypting and decrypting algorithm).

Figure 15:
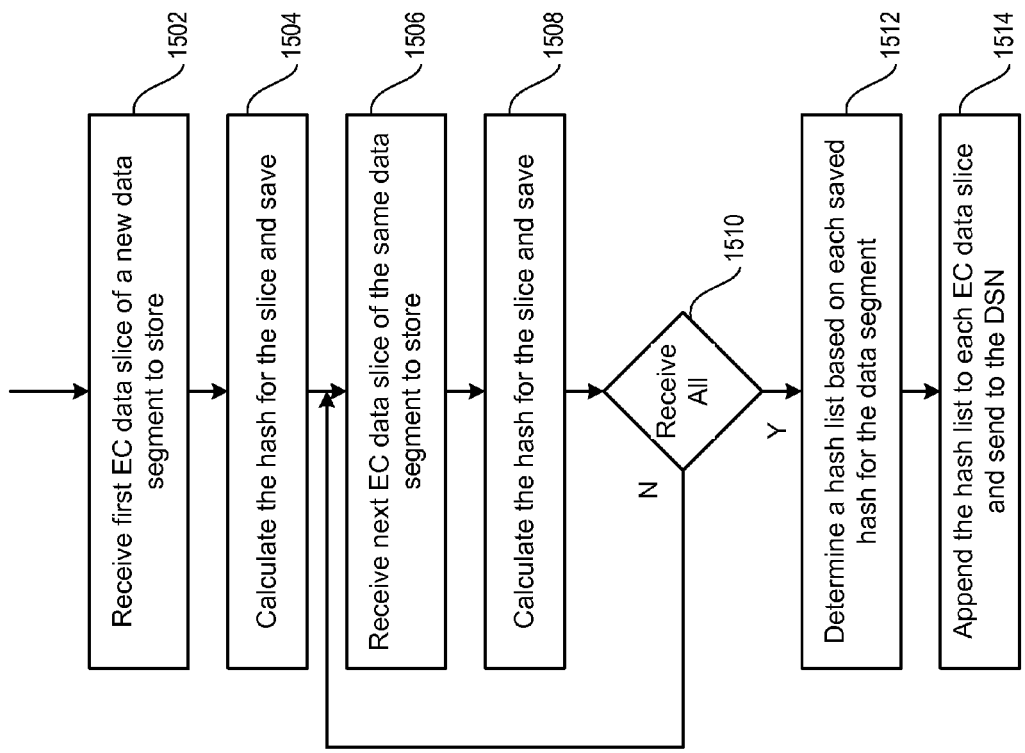
FIG. 15 is a logic diagram of another embodiment of a method for securing data in accordance with the present invention.

FIG. 15 is a logic diagram of another embodiment of a method for securing data where, as illustrated by block 1502, the post-data manipulator 1408 may receive the EC data slice from the slicer 1406 to store. As illustrated by block 1504, the post-data manipulator 1408 may calculate a hash over the EC data slice and cache the hash. Although the term "hash" is used to describe various embodiments herein, the integrity indicators which can be used to implement various embodiments are not limited to simple hashes. Instead the term "hash" is intended to include double hashing, checksums, and other indicators that can be used to verify the integrity of data. The term hash can also include a Hashed Message Authentication Code (HMAC) such as HMAC-SHA1 or HMAC-MD5, and digital signatures. In at least one embodiment, the hash may be a CRC32.

As illustrated by block 1506, the post-data manipulator 1408 may receive the next EC data slice of the same data segment from the slicer 1406 to store. As illustrated by block 1508, the post-data manipulator 1408 may calculate the hash over the next EC data slice and cache the hash. The post-data manipulator 1408 may determine if all of the EC data slices for the same data segment have been processed, as illustrated by block 1510. The determination may be based on the pillar width information from the vault and/or examining the slice names. The post-data manipulator 1408 repeats the steps of receiving the next EC data slice and calculating and caching the hash until all the EC data slices for the same data segment have been processed.

As illustrated by block 1512, the post-data manipulator 1408 may determine an integrity record based on each cached hash for the EC data slices of the data segment. The integrity record may be one or more of an aggregated list of each of the cached hash values, and/or a hash across all the cached hashes. As illustrated by block 1514, the post-data manipulator 1408 may append the integrity indicator to each of the EC data slices and send the EC data slices with appended integrity indicator to the DSN.

Figure 16:
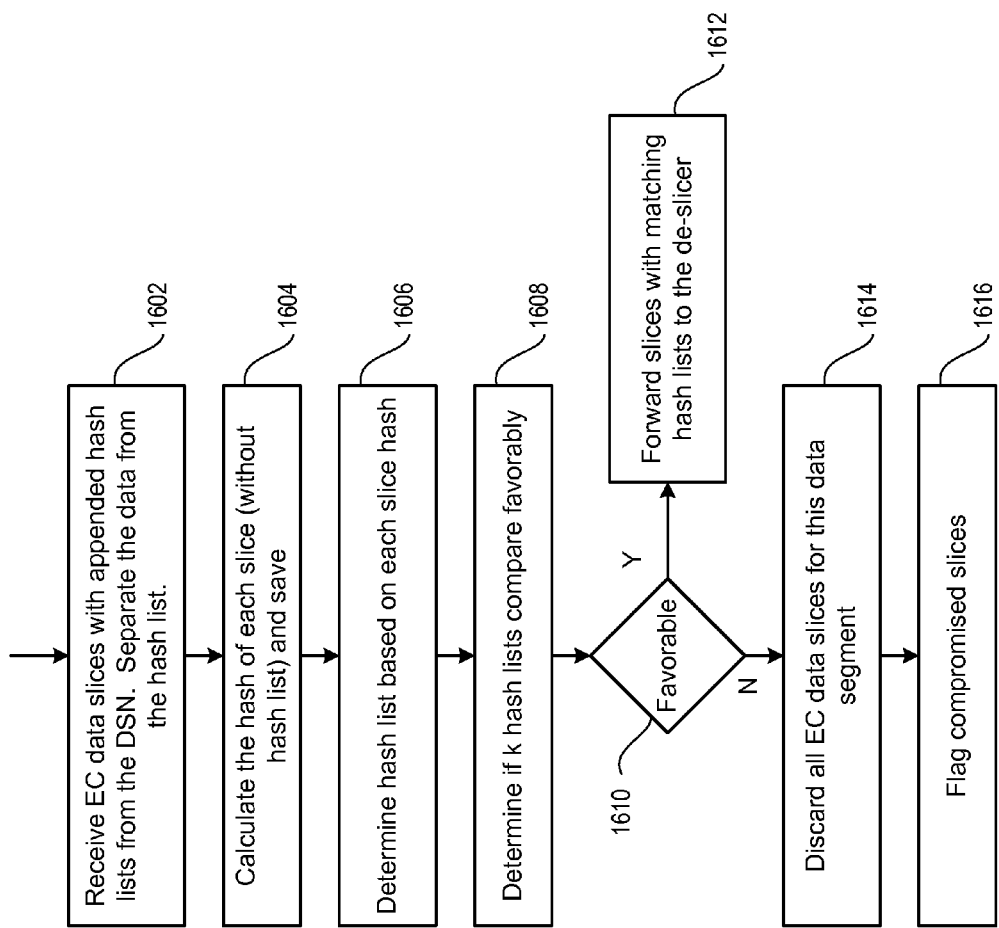
FIG. 16 is a logic diagram of another embodiment of a method for securing data in accordance with the present invention.

FIG. 16 is a logic diagram of another embodiment of a method for securing data where, as illustrated by block 1602, the post-data de-manipulator 1428 may receive EC data slices with appended integrity record from the DSN. Also as illustrated by block 1602, the post-data de-manipulator 1428 may separate the EC data slices from the integrity record. As illustrated by block 1604, the post-data de-manipulator may calculate an integrity indicator of each EC data slice (without the integrity record) and cache the integrity indicator. As illustrated by block 1606, the post-data de-manipulator 1428 may determine the integrity record based on each cached integrity indicator for the received EC data slices of the data segment. The integrity record may be one or more of an aggregated list of each of the cached integrity indicators, e.g. hash values, and/or a hash across all the cached integrity indicators.

As illustrated by block 1608, the post-data de-manipulator may determine if a threshold k integrity records compare favorably. The post-data de-manipulator 1428 may determine a favorable comparison when at least k of the integrity records matches. This may indicate the corresponding EC data slices have not been compromised (e.g., tampered with while stored on the DS storage unit).

As illustrated by blocks 1610 and 1612, the post-data de-manipulator 1428 may forward the EC data slices and corresponding the k integrity records that compared favorably to the de-slicer 1426 for further processing as described with reference to FIG. 6. The post-data de-manipulator 1428 may discard the EC data slices and flag the EC data slices as compromised for just those EC data slices where the integrity record was not identical to the k EC data slices that did compare favorably. The post-data de-manipulator 1428 may remove the DS storage unit from service for just those EC data slices where the integrity record was not identical to the k EC data slices that did compare favorably.

As illustrated by blocks 1610, 1614 and 1616, the post-data de-manipulator 1428 may discard all the EC data slices and flag the EC data slices as compromised for this data segment when the integrity record comparison is not favorable. The post-data de-manipulator may remove each DS storage unit from service for just those EC data slices where the integrity record was not identical to at least one other integrity indicator.

Figure 17:
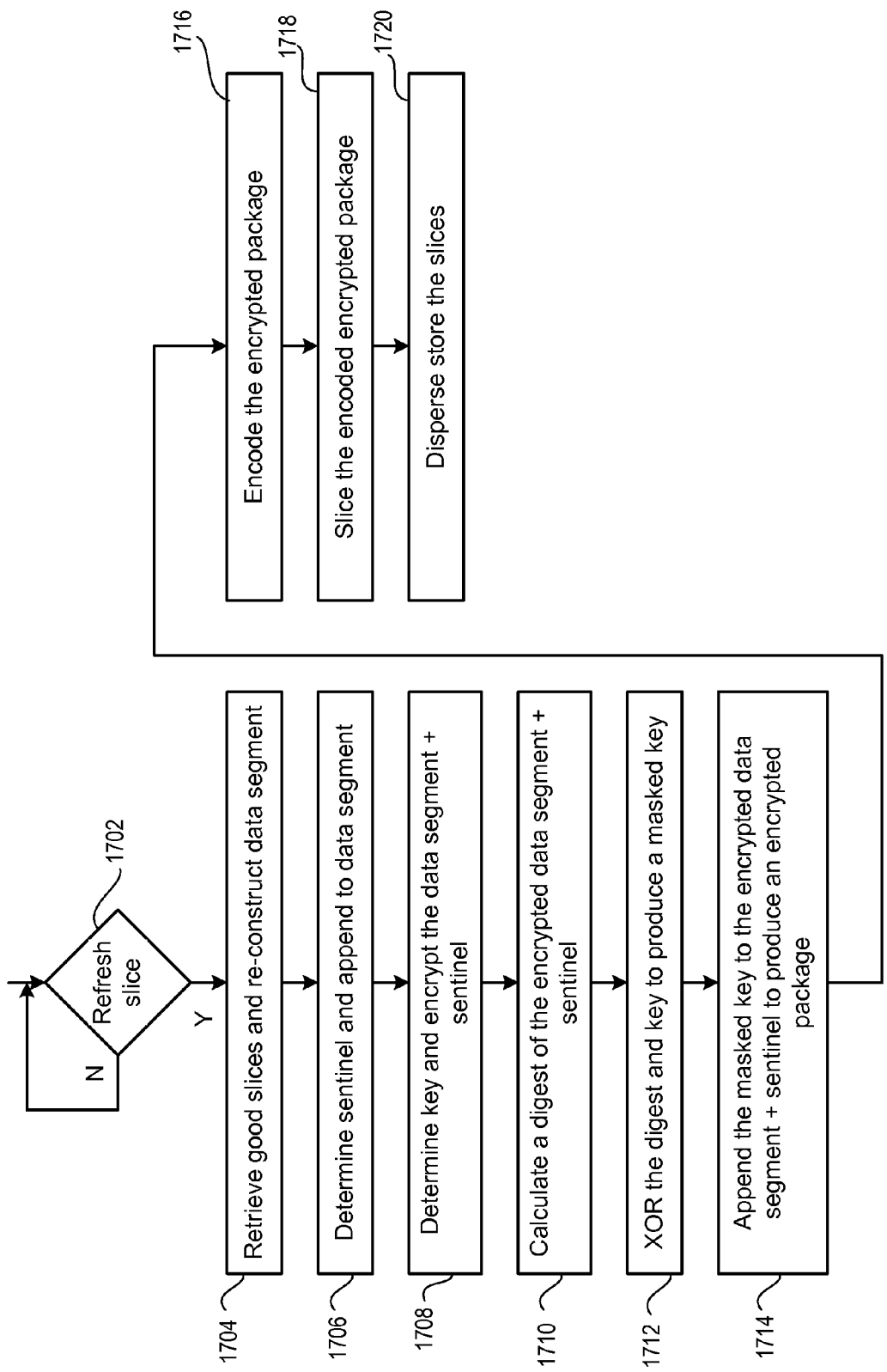
FIG. 17 is a logic diagram of another embodiment of a method for securing data in accordance with the present invention.

FIG. 17 is a logic diagram of another embodiment of a method for securing data where, as illustrated by block 1702, the grid module 1400 refreshes the EC data slices for a portion of the DSN. The grid module 1400 may be part of one or more of the storage integrity processing unit 16, the DS processing unit 14, the user device 10 or 12, the DS storage unit, and/or the DS managing unit 18. The grid module 1400 may determine to the refresh the EC data slices based on one or more of a timer, the security parameters, a compromised EC data slice has been detected (e.g., as described with reference to FIG. 15), and/or a command.

As illustrated by block 1704, the grid module 1400 may retrieve EC data slices for the data segment to produce the re-constructed data segment as described with reference to FIGS. 5, 9, 10, 13, 14, and 16. As illustrated by block 1706, the grid module 1400 may determine the sentinel value and append the sentinel value to the data segment. The grid module 1400 may pre-encrypt the data segment and sentinel utilizing a stored private key and encryption algorithm specified by the security parameters. As illustrated by block 1708, the grid module 1400 may determine the key and encrypt the data segment and sentinel utilizing the key and encryption algorithm specified by the security parameters subsequent to any pre-encryption. The determination of the key may be random such that it is substantially different than the key utilized when the data segment was last stored to the DSN. Re-storing the data segment to the DSN with a different random key may provide an improved level of anti-tampering security.

As illustrated by block 1710, the grid module 1400 may calculate a digest of the encrypted data segment and sentinel value. The digest may be a CRC32 hash. As illustrated by block 1712, the grid module may exclusive OR (XOR) the digest and the key to produce a masked key. As illustrated by block 1714, the grid module 1400 may append the masked key to the encrypted data segment and sentinel value to produce an encrypted package. A portion of the encrypted package may be withheld as discussed with reference to FIG. 9.

As illustrated by block 1716, the grid module 1400 may encode the encrypted package to produce an encoded encrypted package in accordance with the vault parameters. As illustrated by block 1718, the grid module 1400 may slice the encoded encrypted package to produce EC data slices in accordance with the vault parameters. As illustrated by block 1720, the grid module may disperse store the EC data slices to the DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:

encoding a data segment of data in accordance with a dispersed storage error encoding function to produce a plurality of data slices;

for each data slice of the plurality of data slices, calculating, using a hash function, an integrity indicator to a plurality of integrity indicators, wherein the integrity indicator is representative of an original, error-free, version of a corresponding data slice of the plurality of data slices;

performing a function on the plurality of integrity indicators to produce an integrity record, wherein the integrity record is representative of an original, error-free, version of the plurality of data slices;

creating a plurality of copies of the integrity record;

for each of the plurality of data slices, appending one of the plurality of copies of the integrity record to a corresponding one of the plurality of data slices to produce a plurality of modified data slices, wherein a modified data slice of the plurality of modified data slices includes the corresponding data slice, the integrity indicator that represents the original, error-free, version of the corresponding data slice, and the integrity record that represents the original, error-free, version of the plurality of data slices; and transmitting the plurality of modified data slices to slice storage units for storage therein.

2. The method of claim 1 further comprising:

caching the plurality of integrity indicators; and performing an aggregation function that aggregates the plurality of integrity indicators to produce the integrity record.

3. The method of claim 1, further comprising:

caching the plurality of integrity indicators; and performing a hash function that hashes the plurality of integrity indicators to produce the integrity record.

4. The method of claim 1, wherein the calculating the plurality of integrity indicators further comprising:

performing a hash function on a data slice of the plurality of data slices to produce one of the plurality of integrity indicators, wherein the hash function includes one or more of double hashing, checksums, a Hashed Message Authentication Code (HMAC), and digital signatures.

5. An apparatus comprising:

a processor operable to:

encode a data segment of data in accordance with a dispersed storage error encoding function to produce a plurality of data slices;

for each data slice of the plurality of data slices, calculate, using a hash function, an integrity indicator to a plurality of integrity indicators, wherein the integrity indicator is representative of an original, error-free, version of a corresponding data slice of the plurality of data slices;

perform a function on the plurality of integrity indicators to produce an integrity record, wherein the integrity record is representative of an original, error-free, version of the plurality of data slices;

create a plurality of copies of the integrity record;

for each of the plurality of data slices, append one of the plurality of copies of the integrity record to a corresponding one of the plurality of data slices to produce a plurality of modified data slices, wherein a modified data slice of the plurality of modified data slices includes the corresponding data slice, the integrity indicator that represents the original, error-free, version of the corresponding data slice, and the integrity record that represents the original, error-free, version of the plurality of data slices; and a communications interface operable to transmit the plurality of modified data slices to slice storage units for storage therein.

6. The apparatus of claim 5 further comprising:

cache memory to store the plurality of integrity indicators; and the processor further to perform an aggregation function that aggregates the plurality of integrity indicators to produce the integrity record.

7. The apparatus of claim 5 further comprising:

cache memory to store the plurality of integrity indicators; and the processor further to perform a hash function that hashes the plurality of integrity indicators to produce the integrity record.

8. The apparatus of claim 5, wherein the processor is further operable to calculate the plurality of integrity indicators by:

performing a hash function on a data slice of the plurality of data slices to produce one of the plurality of integrity indicators, wherein the hash function includes one or more of double hashing, checksums, a Hashed Message Authentication Code (HMAC), and digital signatures.

* * * * *